US008196950B2

(12) United States Patent
Martin et al.

(10) Patent No.: US 8,196,950 B2
(45) Date of Patent: Jun. 12, 2012

(54) CONVERTIBLE WHEELCHAIR HAVING REMOVABLE SIDE FRAMES

(75) Inventors: Willis E. Martin, Rocky Mount, NC (US); Alexander Bradford Earle, Raleigh, NC (US); Stanley A. Brantley, Jr., Ivor, VA (US); Junius Warren White, Hobbsville, NC (US); Shawn Lane, Chesapeake, NC (US); Deepak Devasagayam, Norfolk, VA (US)

(73) Assignee: Martin Manufacturing Company, LLC, Rocky Mount, NC (US)

( * ) Notice: Subject to any disclaimer, the term of this patent is extended or adjusted under 35 U.S.C. 154(b) by 1088 days.

(21) Appl. No.: 11/453,689

(22) Filed: Jun. 15, 2006

(65) Prior Publication Data

US 2007/0290468 A1 Dec. 20, 2007

(51) Int. Cl.
*B62B 7/14* (2006.01)

(52) U.S. Cl. ........................ 280/648; 280/47.4; 280/647

(58) Field of Classification Search ............... 280/250.1, 280/650, 647, 642; 180/65.1
See application file for complete search history.

(56) References Cited

U.S. PATENT DOCUMENTS

| | | | | |
|---|---|---|---|---|
| 4,034,972 | A | 7/1977 | Peterson | |
| 4,057,240 | A | 11/1977 | Damico et al. | |
| 4,375,295 | A * | 3/1983 | Volin | 280/304.1 |
| 4,405,142 | A * | 9/1983 | Whetstine | 280/250.1 |
| 4,504,988 | A | 3/1985 | Deutchman | |
| 4,545,571 | A | 10/1985 | Chambron | |
| 5,058,871 | A | 10/1991 | Congin et al. | |
| 5,076,390 | A | 12/1991 | Haskins | |
| 5,156,226 | A * | 10/1992 | Boyer et al. | 180/65.1 |
| 5,201,088 | A | 4/1993 | Larsson | |
| D344,702 | S * | 3/1994 | Robertson et al. | D12/133 |
| 5,297,303 | A | 3/1994 | Stafford et al. | |
| 5,410,767 | A | 5/1995 | Barud | |
| 5,412,823 | A | 5/1995 | Sitta | |
| 5,551,756 | A * | 9/1996 | Gurasich et al. | 297/440.2 |
| 5,568,933 | A * | 10/1996 | Mizuno | 280/42 |
| 5,678,267 | A | 10/1997 | Kinder | |
| 5,790,996 | A | 8/1998 | Narfstrom | |
| 5,950,262 | A | 9/1999 | Smoler et al. | |
| 6,135,222 | A * | 10/2000 | Furukawa | 180/65.5 |
| 6,209,463 | B1 | 4/2001 | Koharchik et al. | |
| 6,212,713 | B1 | 4/2001 | Kuck et al. | |
| 6,302,429 | B1 * | 10/2001 | Friedrich | 280/649 |
| 6,499,156 | B1 | 12/2002 | Dirst | |
| 6,866,288 | B2 | 3/2005 | Martin | |
| 6,886,843 | B1 * | 5/2005 | Papac | 280/250.1 |
| 6,889,993 | B2 * | 5/2005 | Chen et al. | 280/287 |
| 6,935,780 | B2 | 8/2005 | Barde et al. | |
| 2005/0077760 | A1 * | 4/2005 | Smith | 297/42 |
| 2007/0085300 | A1 * | 4/2007 | Loewenthal et al. | 280/304.1 |

* cited by examiner

*Primary Examiner* — Jeffrey J Restifo
(74) *Attorney, Agent, or Firm* — Coats & Bennett, P.L.L.C.

(57) ABSTRACT

A wheelchair and an examination table is provided wherein there is provided a connector or connector assembly for connecting the wheelchair to the examination table. Once connected to the examination table, the wheelchair and patient sitting therein can be elevated, after which side frames of the wheelchair can be removed in order to facilitate examination of the patient. In addition, once elevated and the side frames removed, with the aid of a movable back that forms a part of the examination table, the back of the wheelchair can be reclined or positioned in various positions to facilitate examination and procedures.

29 Claims, 41 Drawing Sheets

CONVERTIBLE WHEELCHAIR HAVING REMOVABLE SIDE FRAMES

FIELD OF THE INVENTION

The present invention relates to wheelchairs and examination tables.

BACKGROUND

There are millions of people throughout the world confined to wheelchairs. Many, if not most, routinely visit physicians, dentists and other medical or healthcare related professionals for diagnosis, treatment and checkups. Transferring patients from wheelchairs to an examination table is a real problem in the medical and healthcare communities. First, many patients confined to wheelchairs are feeble and fragile, and because of that, simply transferring the patient from a wheelchair to an examination table has the potential to injure the patient. Unfortunately, many patients confined to wheelchairs are overweight, and even obese. This compounds the problem. In some cases the patient suffers from bed sores and tender and fragile skin that can be broken in the process of lifting the patient from the wheelchair and placing the patient on an examination table. Not only is there concern for the patient, but transferring patients from wheelchairs to examination tables also poses concern for nurses, attendants, doctors and other healthcare providers. Many nurses and medical attendants are injured as a result of attempting to lift a patient from a wheelchair onto an examination table. Injuries, such as back injuries, are common occurrences with nurses and medical attendants transferring patients from wheelchairs to examination tables.

Some physicians may attempt to circumvent this problem by examining and treating the patient while in the wheelchair. This is, of course, difficult even in the best of circumstances and conditions. Wheelchairs are not designed to accommodate medical examinations. When patients occupy wheelchairs they are confined to one single position, and the structure of the wheelchair makes it difficult for the physician to examine certain parts of the patient's body. Moreover, the side frames of the wheelchair make it virtually impossible to access the patient from the sides.

Therefore, there has been and continues to be a need for a patient examination system that addresses the problems of examining patients in wheelchairs.

SUMMARY

The present invention entails a wheelchair having a central section including a seat and a back. The wheelchair includes a pair of side frames with each side frame including one or more wheels. Further, there is provided one or more connectors for detachably connecting at least one side frame to the central section of the wheelchair such that the side frame including its frame structure and one or more wheels can be detachably removed as a unit from the central section.

In addition, the present invention entails a wheelchair that is adapted to be connected to another structure via one or more locks or fasteners associated with the other structure. The wheelchair comprises a seat, a back, and a pair of side frames. In addition the wheelchair includes a locking member for being engaged by the one or more locks or fasteners of the other structures so as to connect the wheelchair to the other structure.

Further, the present invention entails a method of examining a patient in a wheelchair having a central section including a seat and a back and at least one removable side frame where the removal side frame includes at least one wheel mounted thereto. The method entails raising the wheelchair off a support such that the wheelchair is not supported by the wheels thereof, and removing at least one side frame from the central section in order to facilitate access to the patient.

Other objects and advantages of the present invention will become apparent and obvious from a study of the following description and the accompanying drawings which are merely illustrative of such invention.

DESCRIPTION OF THE INVENTION

Figure 1:
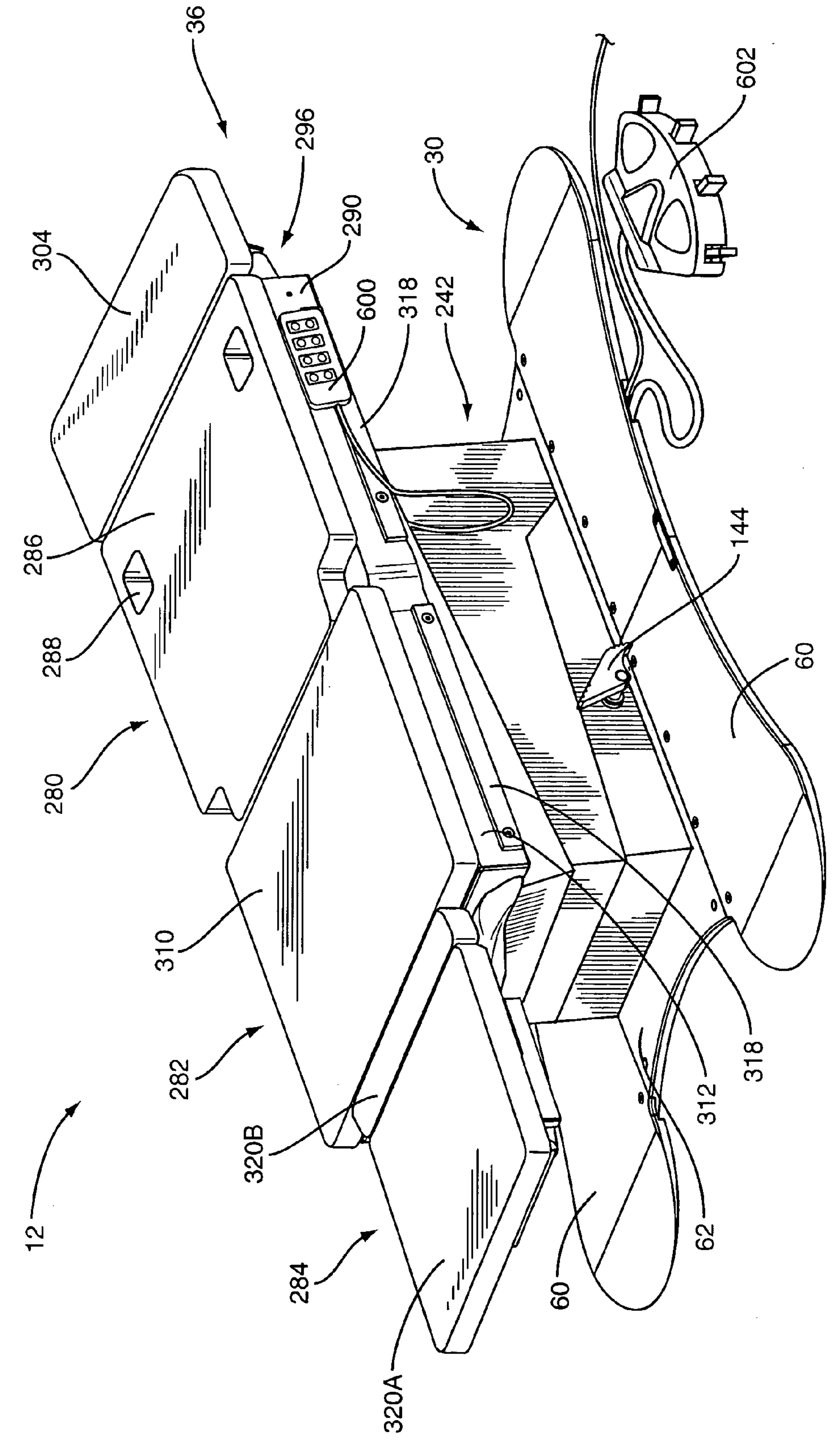
FIG. 1 is a perspective view of the examination table of the present invention shown in horizontal configuration.
Figure 24:
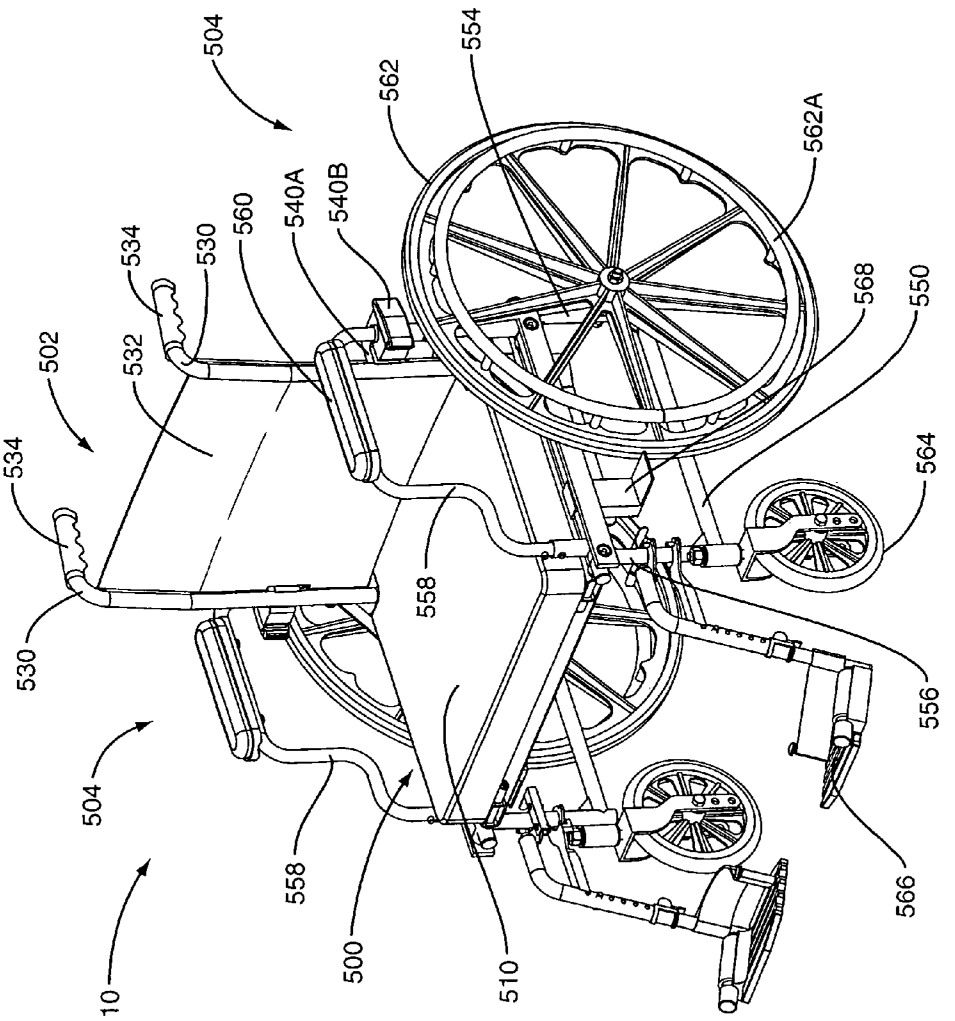
FIG. 24 is a perspective view of the wheelchair of the present invention.

With further reference to the drawings, the patient examination system of the present invention is shown therein and basically comprises a wheelchair indicated generally by the numeral 10 (FIGS. 24-25) and an examination table indicated generally by the numeral 12 (FIG. 1).

Briefly reviewing wheelchair 10 and examination table 12, the wheelchair includes a central section comprised of a seat indicated generally by the numeral 500 and a back indicated generally by the numeral 502. Back 502 may pivot with respect to the seat 500 thereby giving rise to a convertible wheelchair. Removably mounted to the seat 500 and back 502 is a side frame indicated generally by the numeral 504. As will be appreciated from subsequent portions of this disclosure, the side frames 504 can be quickly and easily removed from the central section of the wheelchair 10 to facilitate the examination of a patient while the wheelchair is supported on the examination table 12.

Examination Table

Figure 2:
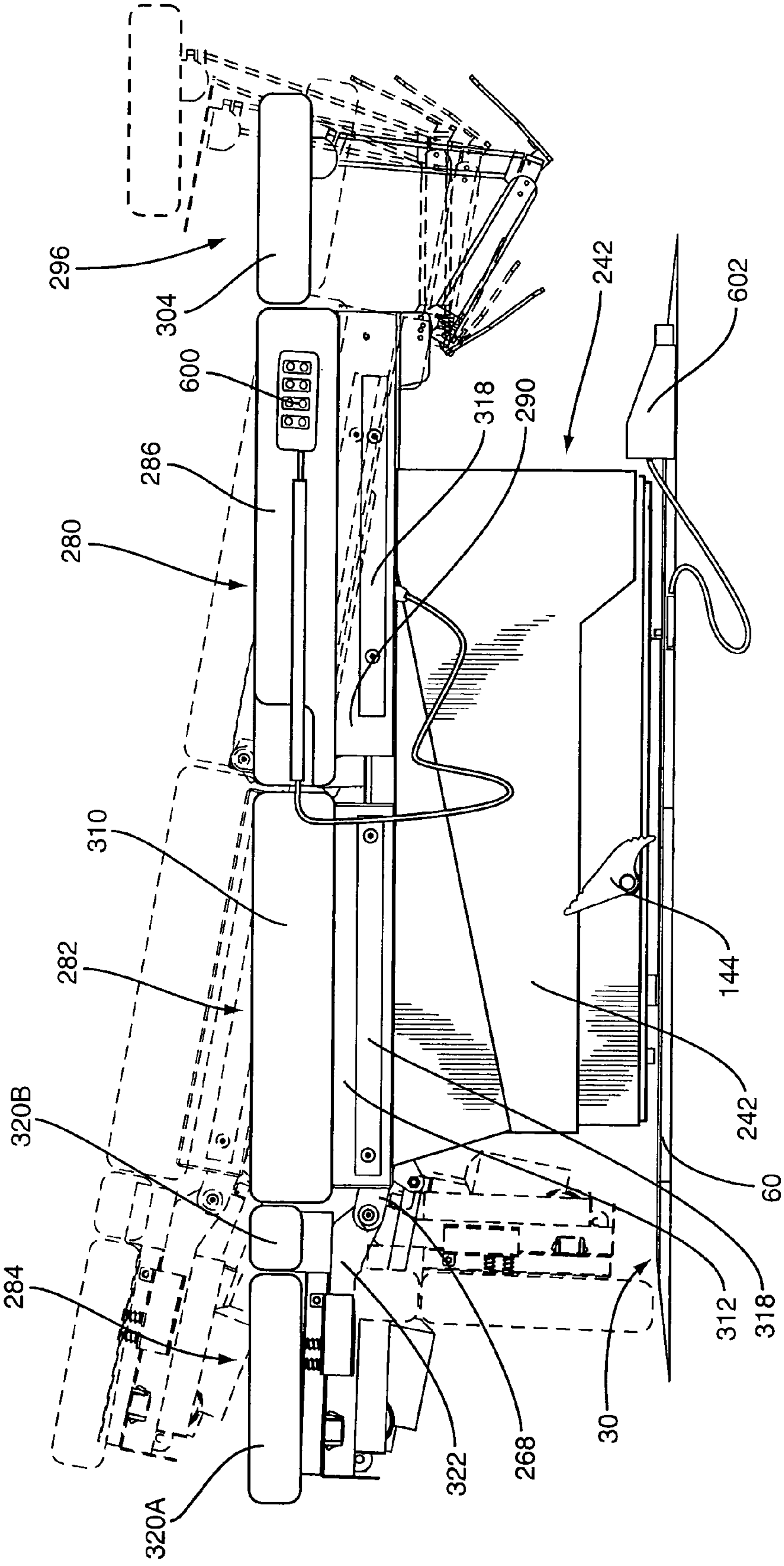
FIG. 2 is a side elevational view of the examination table with the examination table being shown in a tilted configuration by dotted lines.
Figure 9:
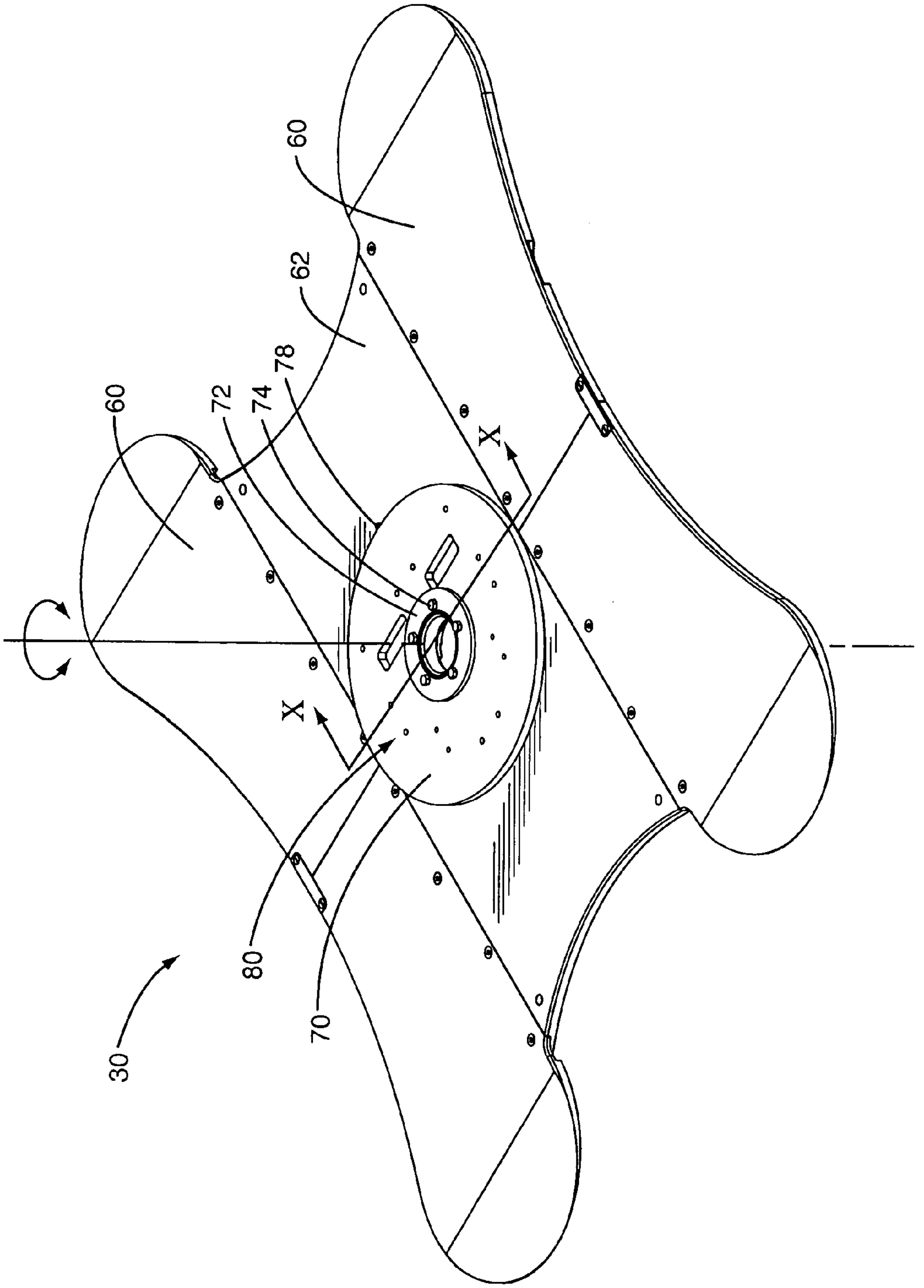
FIG. 9 is a perspective view of the base plate or pad that supports the examination table.
Figure 10:
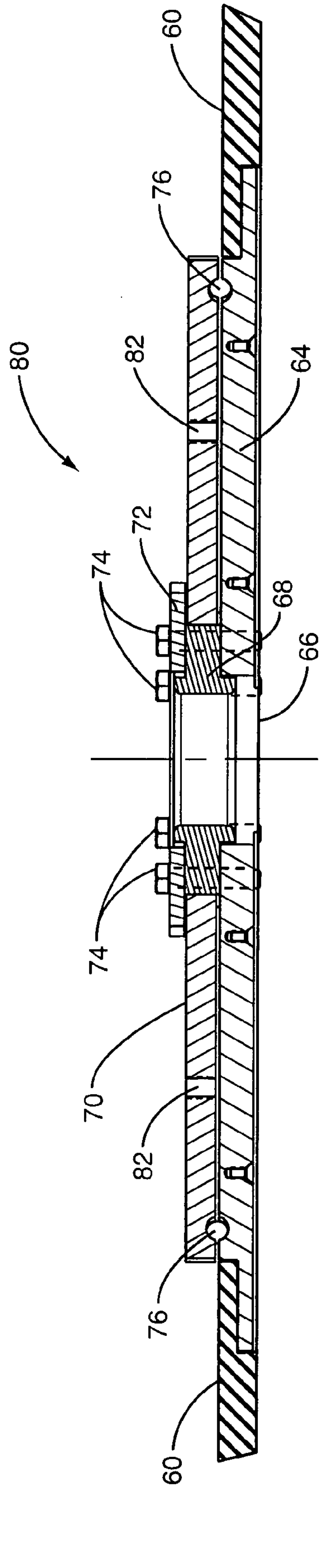
FIG. 10 is a sectional view taken through the line X-X of FIG. 9.
Figure 11:
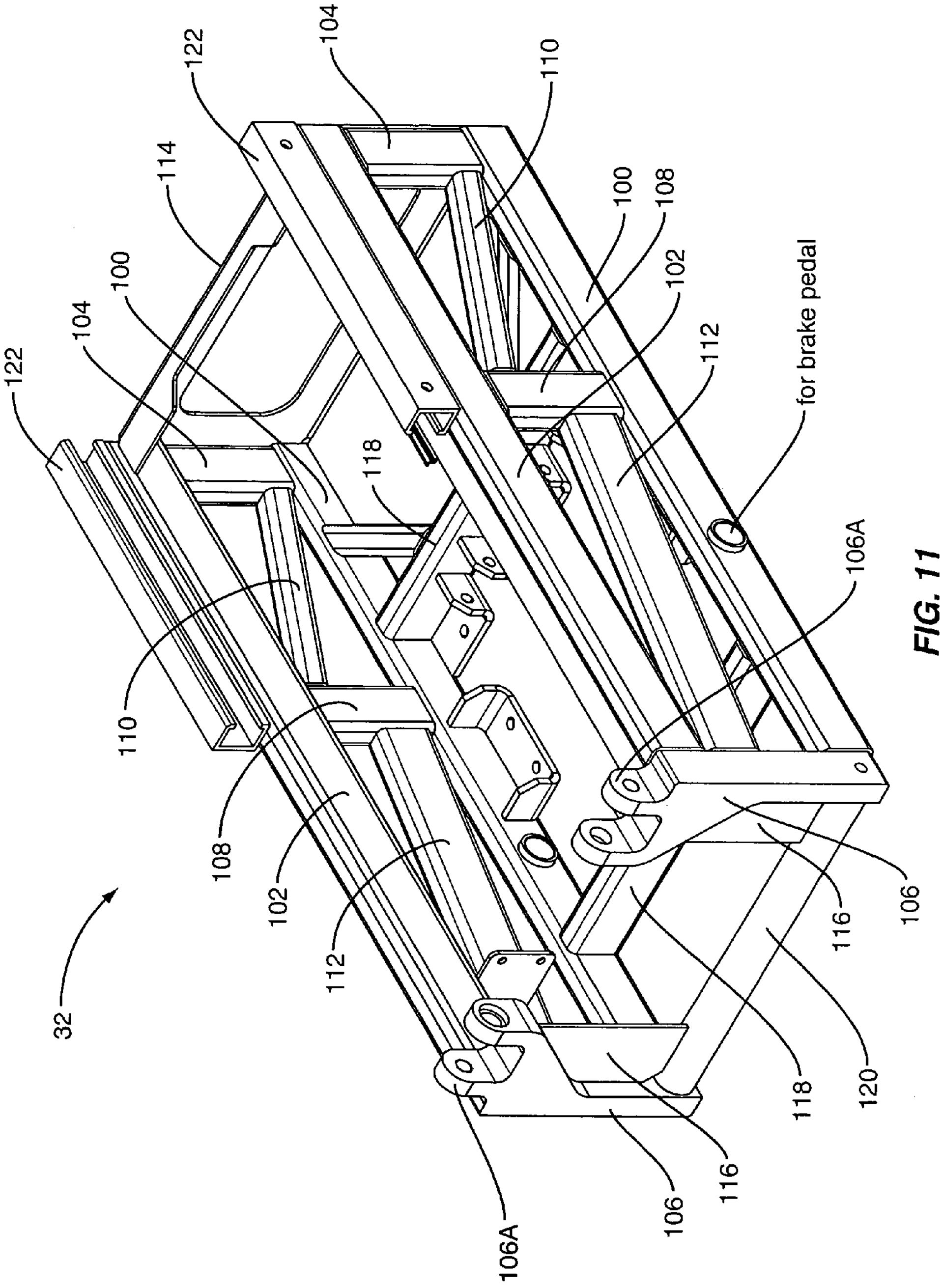
FIG. 11 is a perspective view of the base frame of the examination table.
Figure 12:
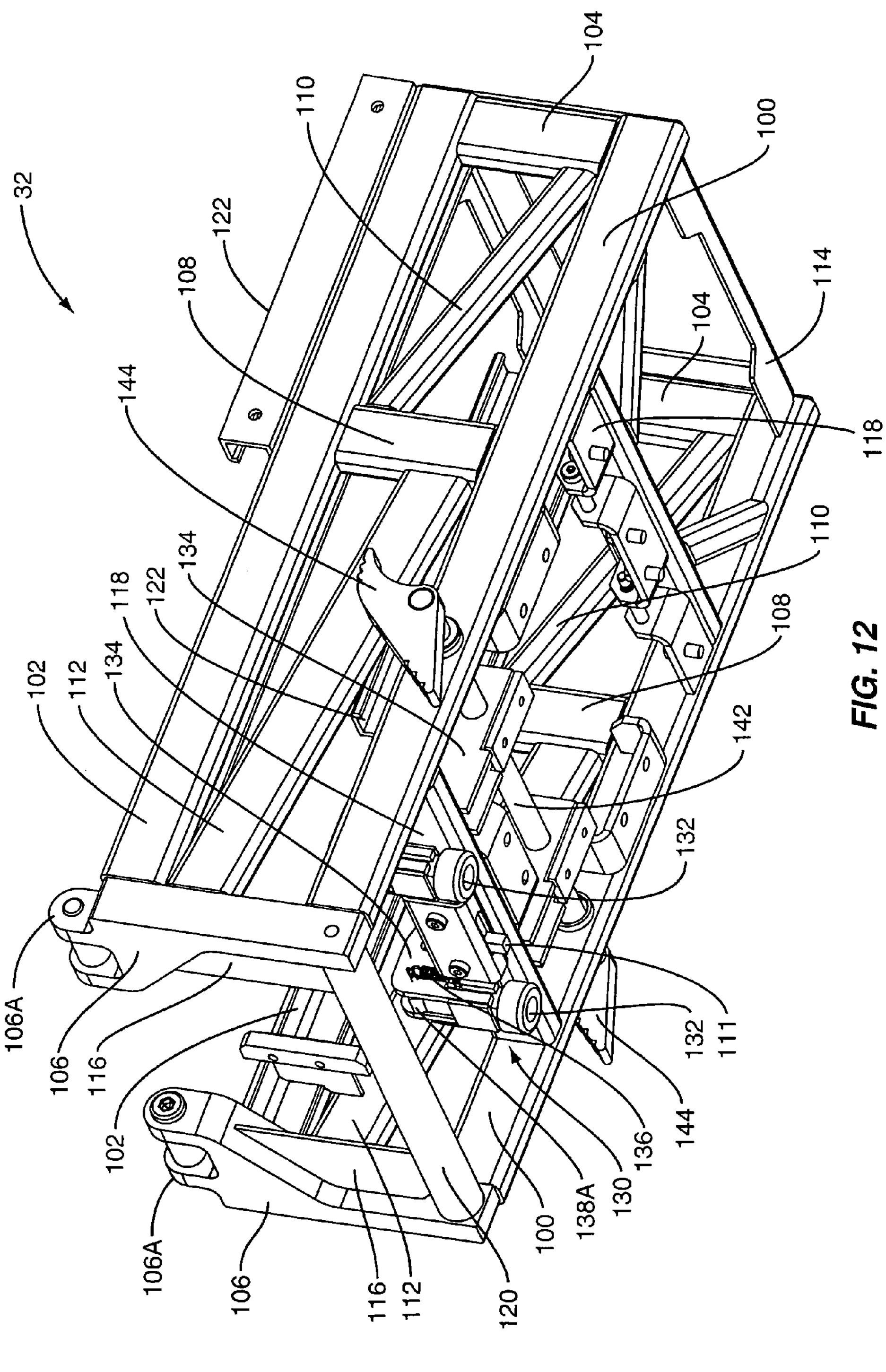
FIG. 12 is a perspective view of the base frame, viewed from below and which illustrates a brake assembly for stationing the base frame.
Figure 13:
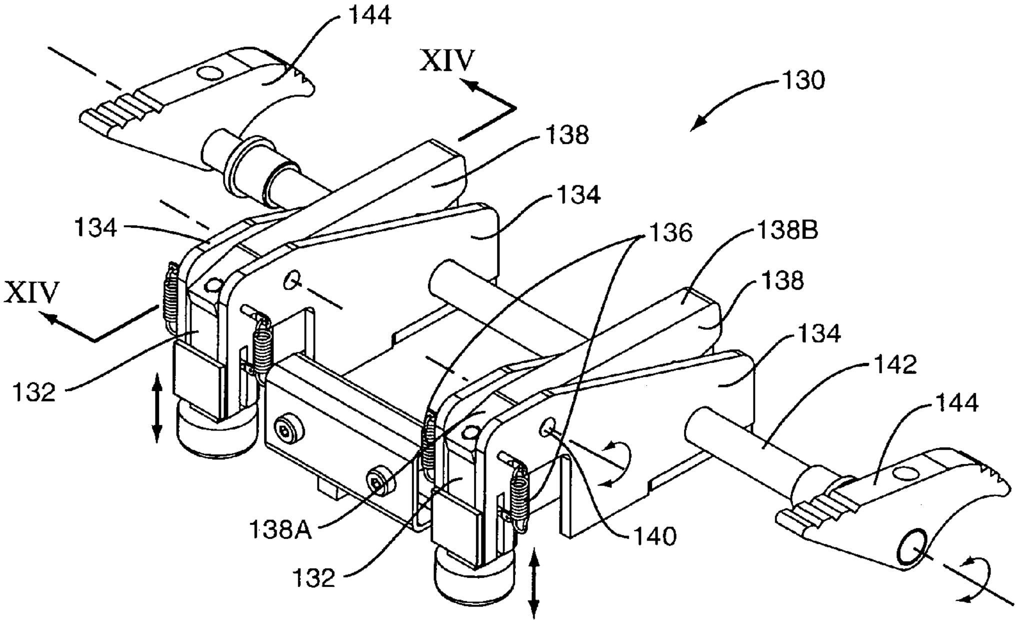
FIG. 13 is a perspective view of the brake assembly.

Turning to the examination table 12, the examination table comprises a series of subassemblies or components. The term “examination table” means a table that receives and supports humans for the purpose of conducting an examination, performing a diagnosis, giving treatment, or conducting a procedure, and includes medical examination tables and medical or dental examination devices that can assume a table configuration, a chair configuration, and various intermediate configurations. Examination table 12 includes a base plate or base pad indicated generally by the numeral 30 (FIGS. 9-10). Rotatively supported on the base plate 30 and rotatable about an angle of 360° is a base frame indicated generally by the numeral 32 (FIGS. 11-12). Secured to the base frame 32 is a scissor-type lift assembly indicated generally by the numeral 34 (FIGS. 6, 7, 15 and 16). As will be appreciated from subsequent portions of the disclosure, lift assembly 34 can be raised and lowered. Mounted to the lift assembly 34 is an articulating table, indicated generally by the numeral 36, which may assume numerous configurations. For example, it may assume a horizontal table configuration, tilted table configuration, or a chair configuration. See FIGS. 1, 2, and 3.

As seen in the drawings, a principal feature of the patient examination system of the present invention is the ability to connect wheelchair 10 to the examination table 12 and to raise the wheelchair from a floor or underlying support surface with the patient positioned therein, after which the wheelchair can be converted from a chair configuration to a generally horizontal configuration or to any number of intermediate configurations. To achieve the wheelchair-examination table connection, the system of the present invention is provided with a connector or connector assembly indicated generally by the numeral 50. See FIGS. 17, 21, 22A, 22B, and 22C. Connector 50 permits wheelchair 10 to be securely fastened or locked to the examination table 12 such that the entire wheelchair, with a patient occupying the same, can be lifted from an underlying support surface. This of course means that the patient never has to be lifted from the wheelchair and transferred onto the examination table in order for an examination to be performed.

Turning to a more detailed discussion of the examination table 12, the base plate or base pad 30 is illustrated in FIGS. 9 and 10. Base plate 30 is adapted to be placed over a floor area and includes two outer sections 60 and a central section 62. Sections 60 and 62 add stability and can be constructed of various materials such as rubber, vinyl or metal. Secured in the central section 62 is a rotating base 80. Rotating base 80 includes a stationary lower base 64 having a central opening 66 formed therein. See FIG. 10. A bearing 68 is secured in the opening 66. A rotating plate 70 extends outwardly from bearing 68 and rotates about the bearing. An upper collar or flange 72 is bolted to the bearing 68 and base 64 by a series of bolts 74. As seen in FIG. 10, collar 72 extends from the bearing 68 and overhangs a top portion of the rotating plate 70. Collar 72 retains the rotating plate 70 about the bearing 68. Also, bolts 74 extend downwardly through both the bearing 68 and the underlying base 64, thereby fixing the bearing with respect to the base. Both the rotating plate 78 and the base 64 include a circular bearing track for receiving a series of ball bearings 76. Note in FIG. 10 where the ball bearings 76 are sandwiched between the underside of the rotating plate 70 and the upper side of the base 64. This permits the rotating plate 70 to rotate about the axis of the bearing 68.

Disposed adjacent the rotating base 80 is a stop 78. Stop 78 extends upwardly adjacent the rotating base and will engage another stop 111 (FIG. 12) associated with the base frame 32. This will effectively limit the rotation of the base frame 32 to approximately 360°. That is, base frame 32 is not permitted to continuously rotate.

Disposed on the rotating base 80 of the base plate 30 is the base frame 32 of the examination table 12. Base frame 32 is bolted to the rotating base 80 such that the base frame 32 and the structure of the examination table 12 supported thereby can rotate for the purpose of selectively positioning a patient occupying the examination table 12. Rotating base 80 of the base plate 30 is slightly elevated with respect to the adjacent outer and central sections 60 and 62 of the base plate 30 such that the bottom of the base frame 32 that extends or overhangs from the rotating base will not engage sections 60 and 62 and result in interference. Wiring for the controls can be directed through the channels formed in the underside of base 64 of the base pad 30. See FIG. 10. Further, the wiring can be directed upwardly through opening 66 and bearing 68, and upwardly through the base frame 32. Thus, when the base frame 32 and examination table 12 rotate about the base pad 30, wiring for the controls is well managed and resists being pulled and tangled by the rotation.

Viewing base frame 32 in more detail and with particular reference to FIGS. 11 and 12, the base frame 32 includes a pair of side frames. Each side frame includes a lower member 100 and an upper member 102. Members 100 and 102 are interconnected at the back by a pair of corner members 104. Opposite the back corner members 104 is a pair of front corner members 106 that interconnect the upper and lower members 102 and 100. Formed about upper portions of each of the front corner members 106 is a clevis or connecting point indicated by 106A. Connected intermediately between the corner members 104 and 106 is an intermediate post 108. Extending diagonally in each side frame is a pair of diagonal members 110 and 112.

Disposed about the back end of the base frame 32 is an end plate 114. On the opposite end there is provided a pair of corner reinforcements 116. Extending between the side frames about the front portion of the base frame 32 is a crossbar 120. For providing additional support there is provided a series of cross members 118 that extend between the respective side frames. Secured about the back portion of the base frame 32 is a pair of opposed guide rails 122. Guide rails 122 are secured atop the upper members 102 and extend a selected distance from the back end of the base frame 32 to an intermediate area thereof. Each guide rail assumes a generally C-shaped configuration and is opened from an interior side.

Figure 14A:
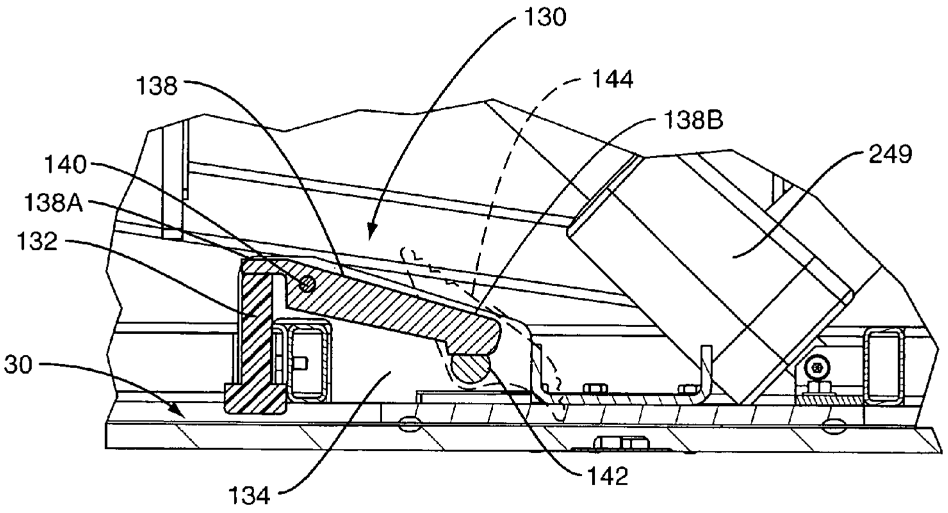
FIG. 14A is a side elevational view showing the brake assembly disengaged.
Figure 14B:
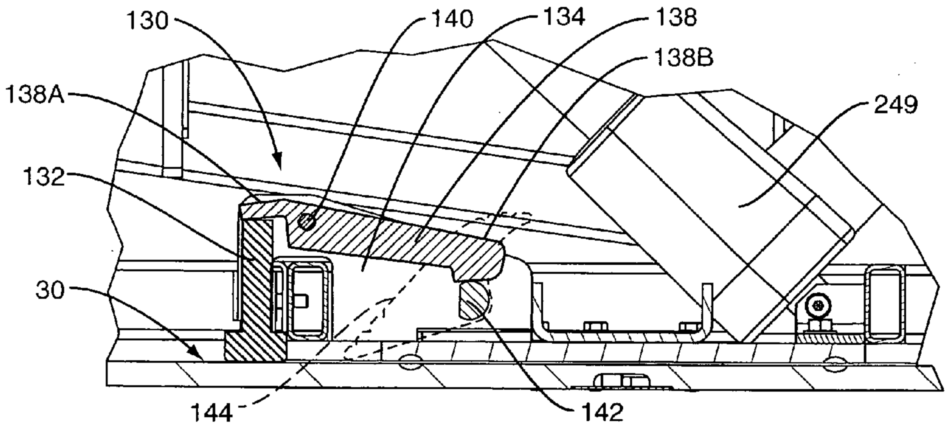
FIG. 14B is a fragmentary sectional view showing the brake assembly deployed.

Base frame 32 rests on the rotating base 80 of the base plate 30 and therefore can rotate 360° with respect to the base plate. A brake assembly indicated generally by the numeral 130 is incorporated into the base frame 32 for stationing the base frame on the base plate 30. See FIGS. 12-14B. Normally, brake assembly 130 is deployed and engages the base plate 30 so as to anchor and station the base frame 32 with respect to the base plate 30. However, as discussed below, the brake assembly 130 can be released so as to permit the base frame 32 to freely rotate with the rotating base 80 of the base plate 30. With particular reference to the structure of the brake assembly 130, the same includes a pair of feet 132 that are movable up and down with respect to the base frame 32. Feet 132 are housed within a frame structure disposed generally within the base frame 32. This frame structure includes a series of plates 134 with each pair of plates being associated with one of the feet 132. Note in FIGS. 14A-14B where each foot 132 is movable up and down within the frame structure. Feet 132 are biased to assume an upper or released position. This is achieved by the provision of two springs 136 with each spring being connected between one foot 132 and a respective plate 134. Pivotally mounted between each pair of plates 134 is an actuator 138. Actuator 138 includes a head 138A that lies above and in contact with one foot 132. At the opposite end of the actuator 138, there is provided a cam follower 138B. Actuator 138 is pivotally mounted about a pivot pin 140 that extends between a pair of plates 134. Extending transversely through the plates 134, and rotatively mounted therein, is a shaft 142. As seen in the drawings, shaft 142 is an eccentric shaft and generally forms a cam. The cam portion of shaft 142 extends under and engages the cam follower 138B of the actuator 138. The brake assembly 130 is foot actuated by an attendant or physician. Note in FIG. 14A where the brake assembly 130 is not employed as the feet 132 are raised and do not engage the underlying base plate 30. In this case, the springs 136 bias the feet 132 upwardly causing the actuator 138 to rotate clockwise as viewed in FIG. 14A. Because the cam portion of shaft 142 includes a flat side that now engages the cam follower 138B of the actuator 138, the spring 136 effectively lift the feet 132 from the underlying base plate 30. To lock or station the base frame 32 in a generally fixed position on the base plate 30, the attendant or physician engages one of the two foot levers 144 that are connected to shaft 142. By rotating the shaft 142 counterclockwise as viewed in FIG. 14B, the shaft 142 is turned such that it engages the cam follower 138B and causes the actuator 138 to rotate about pivot pin 140 counterclockwise. This causes the actuator head 138B to press down on the top of feet 132, causing the feet to move downwardly against the force of the springs 136. The lower portion of the feet 132 engage the underlying base plate 30 and station the base frame 32. To release the brake assembly 130, either foot lever 144 can be rotated clockwise as viewed in FIGS. 14A and 14B so as to permit the springs 136 to retract and lift the feet 132.

Mounted to the base frame 32 is lift 34. While various types of lift structures can be incorporated into the examination table 12, in one embodiment the lift structure is of a scissor type lift device. With reference to FIGS. 5-7 and 15-16, the lift assembly 34 comprises two arm assemblies that are rotatably coupled such that as the lift assembly moves up or down the two arm assemblies rotate about a common axis.

With respect to a first arm assembly that forms a part of the lift assembly 34, it is seen that the same includes two spaced apart outer arms 200 and 202. Arms 200 and 202 extend in general parallel relationship and about the upper portion of each there is provided an outer reinforcing rib 208. Securing arms 200 and 202 together is a lower cross member 204 and a reinforcing gusset 210. About the opposite end of the first arm assembly, there is an opening between arms 200 and 202.

Figure 15:
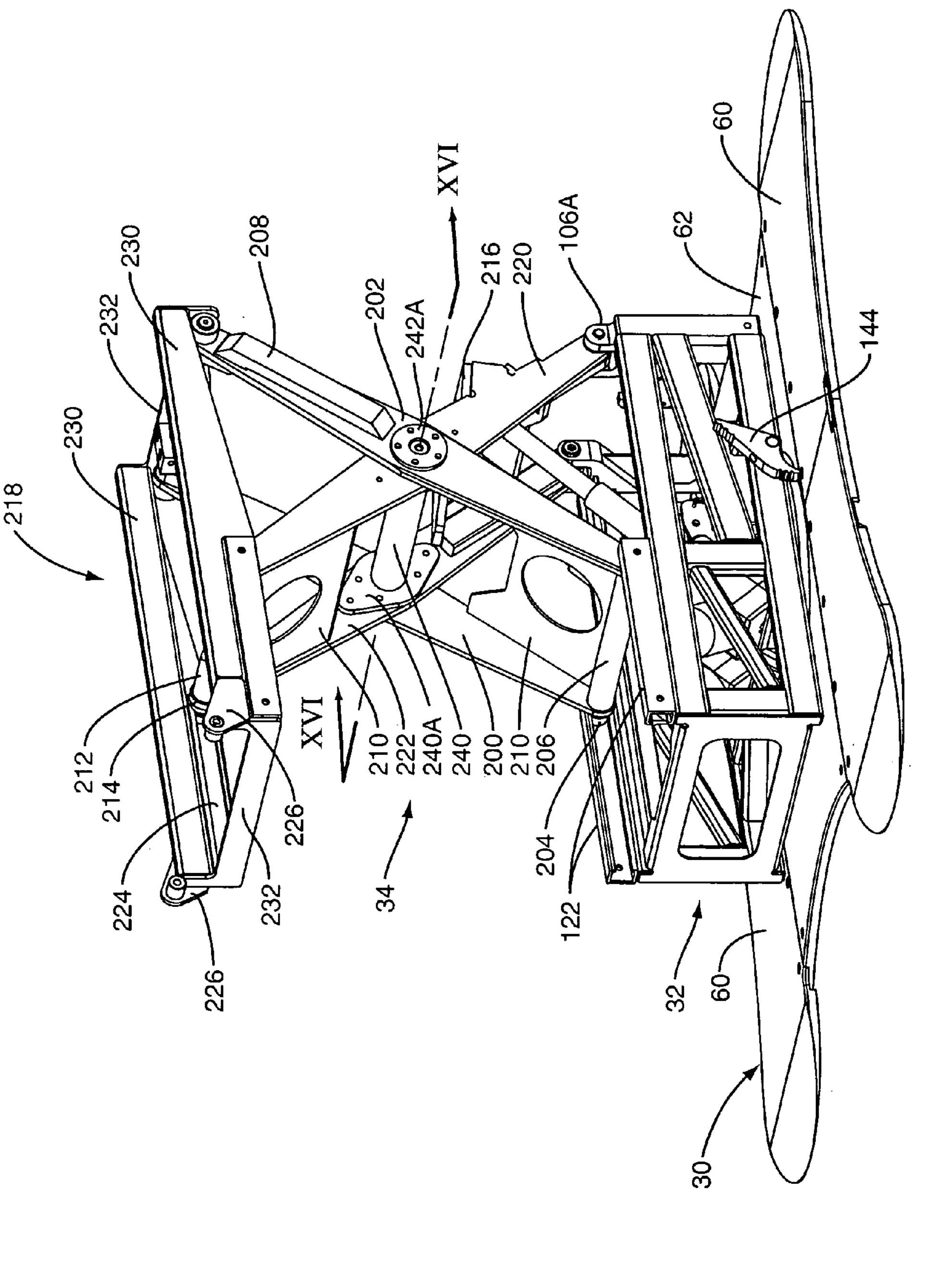
FIG. 15 is a perspective view of the base frame and lift assembly of the examination table.

Arms 200 and 202 are interconnected with the base frame 32. More particularly, there is provided a pair of rollers 206 rotatively mounted to the opposite ends of the lower cross member 206. Rollers 204 are confined within the guide channels 122 that are mounted on the base frame 32. This is illustrated in FIG. 15. Stops (not shown) are provided on opposite ends of the respective channels 122 to confine rollers 206 within the guides 122. Hence, as viewed in FIG. 15, as the lift assembly 34 moves up and down, rollers 206 roll back and forth within guides 122.

Disposed interiorly of the first arm assembly just described is a second arm assembly. The second arm assembly includes a pair of arms 220 and 222. Note that arm 220 is disposed just inwardly of arm 202 and that arm 222 is disposed just inwardly of 200. Like arms 200 and 202, arms 220 and 222 about their upper portion include outer reinforcing ribs 208. Arms 220 and 222 extend in parallel relationship and are secured together by an upper cross member 212 and an upper gusset plate 210. Rotatively mounted on opposite ends of the upper cross member 212 is a pair of rollers 214. Also connecting arms 220 and 222 is a cross member assembly 216. The function of the cross member assembly 216 is to connect to a pair of actuators, which will be described subsequently herein, that power the lift assembly 34 up and down.

Figure 5:
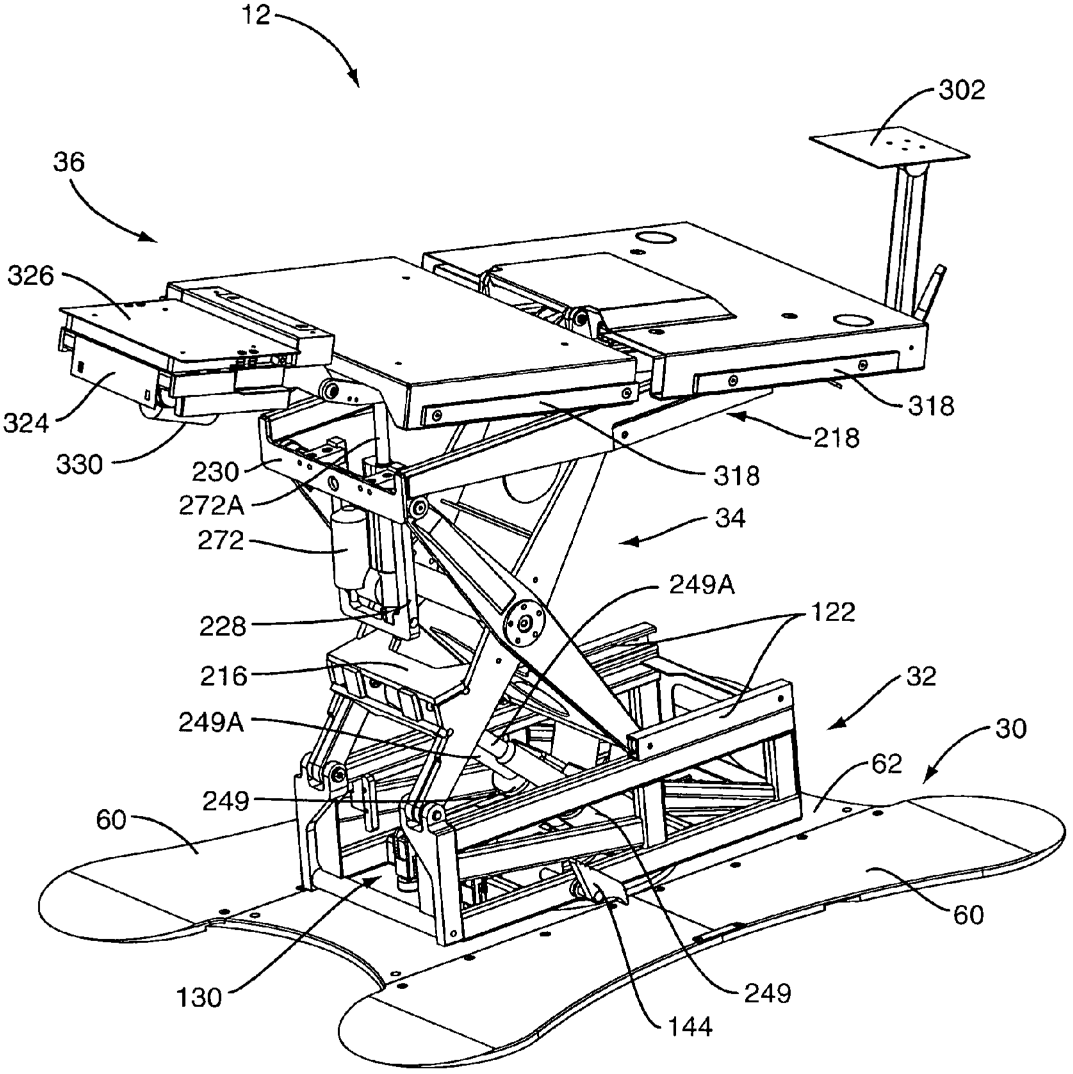
FIG. 5 is a perspective view of the examination table with housing panels removed and upholstered cushions removed to better illustrate the structure of the examination table.

As seen in FIGS. 5 and 15 the lower ends of arms 220 and 222 are pivotally connected to the connectors or devises 106A that form a part of the base frame 32. Hence, as the lift assembly 34 moves up and down to raise and lower the examination table 12, the lower ends of arms 220 and 222 will pivot about a pair of pivot pins that connect the lower extremities of these two arms to the base frame 42.

Figure 18:
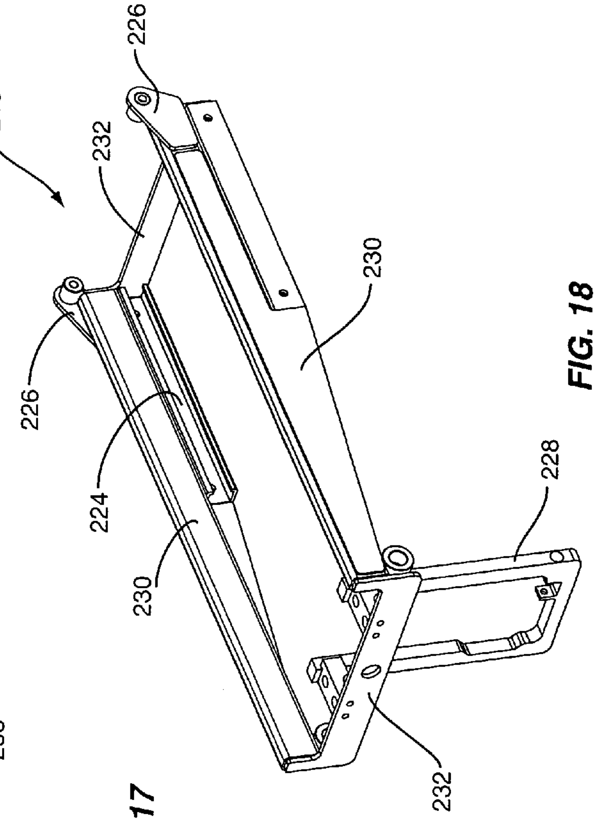
FIG. 18 is a perspective view of a frame that forms a part of the lift assembly, and which connects to and supports the frame of FIG. 17.

Secured to the upper extremities of the arms 200, 202, 220 and 222 is a lift frame, indicated generally by the numeral 218, and which assumes a generally rectangular form and includes a pair of spaced apart generally parallel extending longitudinal members 230. See FIGS. 15 and 18. Connecting longitudinal members 230 together about opposite ends is a pair of end members 232. Secured about a portion of the longitudinal members 320 is a pair of generally C-shaped guide rails 224. Guide rails 224 do not extend the full length of the elongated members 220, but extend from a front portion of the lift frame 218 a selected distance adjacent the longitudinal members 220. Rollers 214 associated with arms 220 and 222 are confined within the guide rails 224. Guide rails 224 also include stops (not shown) to limit the range of movement of rollers 214 therein. About the front end of the lift frame 218, there is provided a pair of connectors for connecting to the upper ends of the outside arms 200 and 202. More particularly, the upper ends of arms 200 and 202 are pivotally connected by pivot pins to the front end portion of the lift frame 218. Therefore, as the lift assembly 34 moves up and down, the ends of each set of arms move in guide rails (associated with the base frame 32 or lift frame 218) while the other end of the same set of arms is pivotally connected to either the base frame 32 or to the lift frame 218. In a collapsed or lower position (FIG. 7A), rollers 206 and 214 will lie at an extreme outer end of the respective guide channels 122 and 224. In an elevated or raised position, rollers 206 and 214 will lie at an inner extreme position in the guide rails 122 and 224. See FIG. 15.

Figure 16:
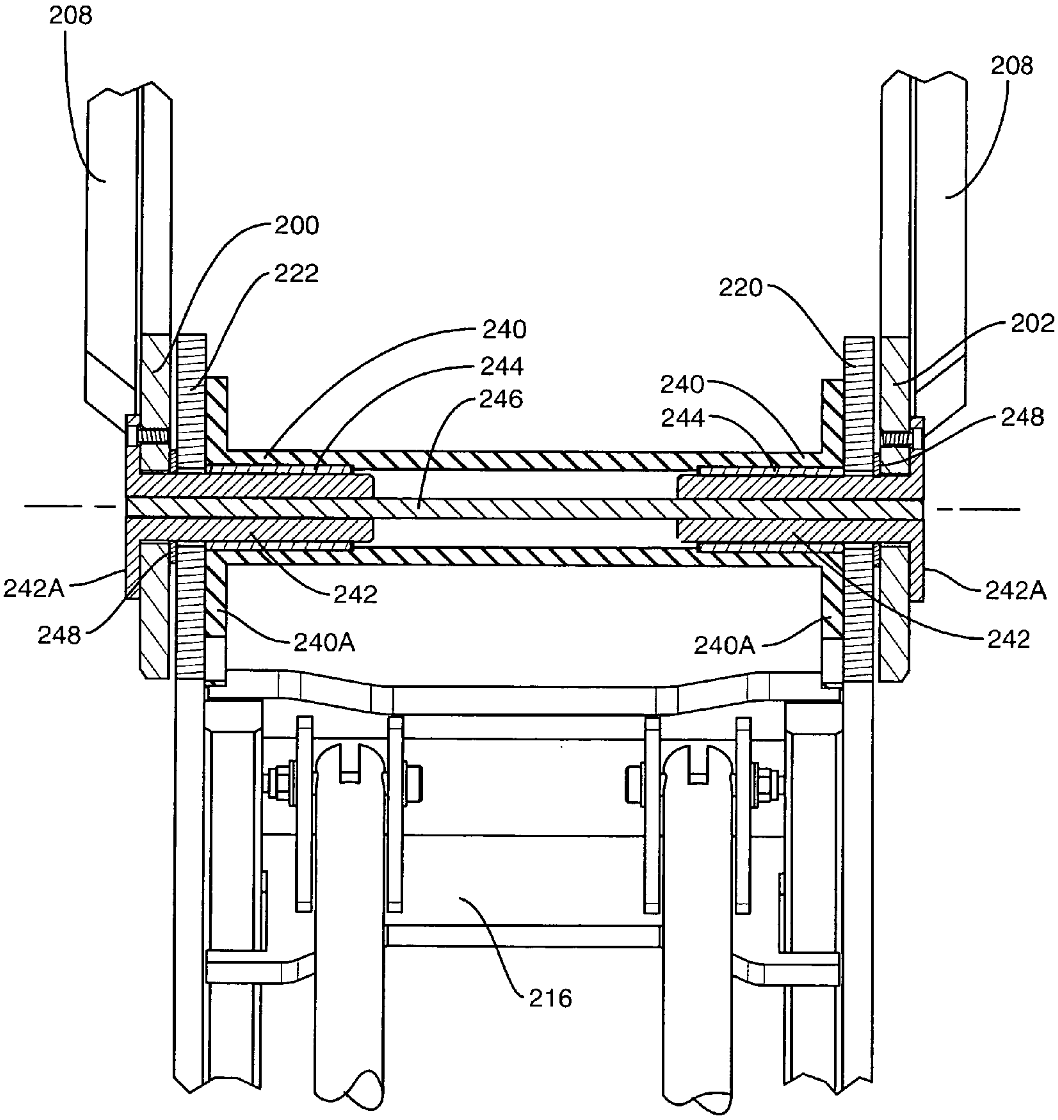
FIG. 16 is a sectional view taken through the line XVI-XVI of FIG. 15.

The first and second arm assemblies discussed above are connected together by a pivot assembly. See FIGS. 15 and 16. The pivot assembly basically joins arms 200, 202, 220 and 222 and permits the arms to rotate about a common axis. As the lift assembly 34 moves up and down, the axis of the pivot assembly likewise will move vertically. Viewing the pivot assembly in more detail, the same includes a central tube 240 that extends between the inner arm 220 and 222. Formed on the ends of central tube 240 is a flange 240A that connects through a series of bolts to the inner arms 220 and 222. Inserted into the central tube 240, from opposite ends, is a pair of stub shafts 242. Each stub shaft 242 includes an outer collar or flange 242A. Each collar 242A is bolted to an outer arm 200 or 202. As seen in FIG. 16, the body of stub shaft 242 projects inwardly from the collar 242A into the hollow portion of central tube 240. A bearing 244 is interposed between the outer surface of the stub shaft 242 and the interior surface of the central tube 240. See FIG. 16. Various types of bearings can be utilized, but in one embodiment bearing 244 comprises an oil impregnated bronze bushing. Interconnecting the stub shafts 242 is a central shaft 246. To space the inner arms 220 and 222 from the outer arms 200 and 202 there is provided a thrust washer 248. Note that each thrust washer 248 surrounds a stub shaft 242 and spaces the inner arms 220 and 222 from the outer arms 200 and 202. Consequently, as the lift assembly 34 moves up and down, the stub shafts 242 are constrained to rotate with the outer arms 200 and 202. At the same time the stub shafts 242 will rotate relative to the central tube 240 because the central tube 240 is constrained to rotate with the inner arms 220 and 222.

Figure 7:
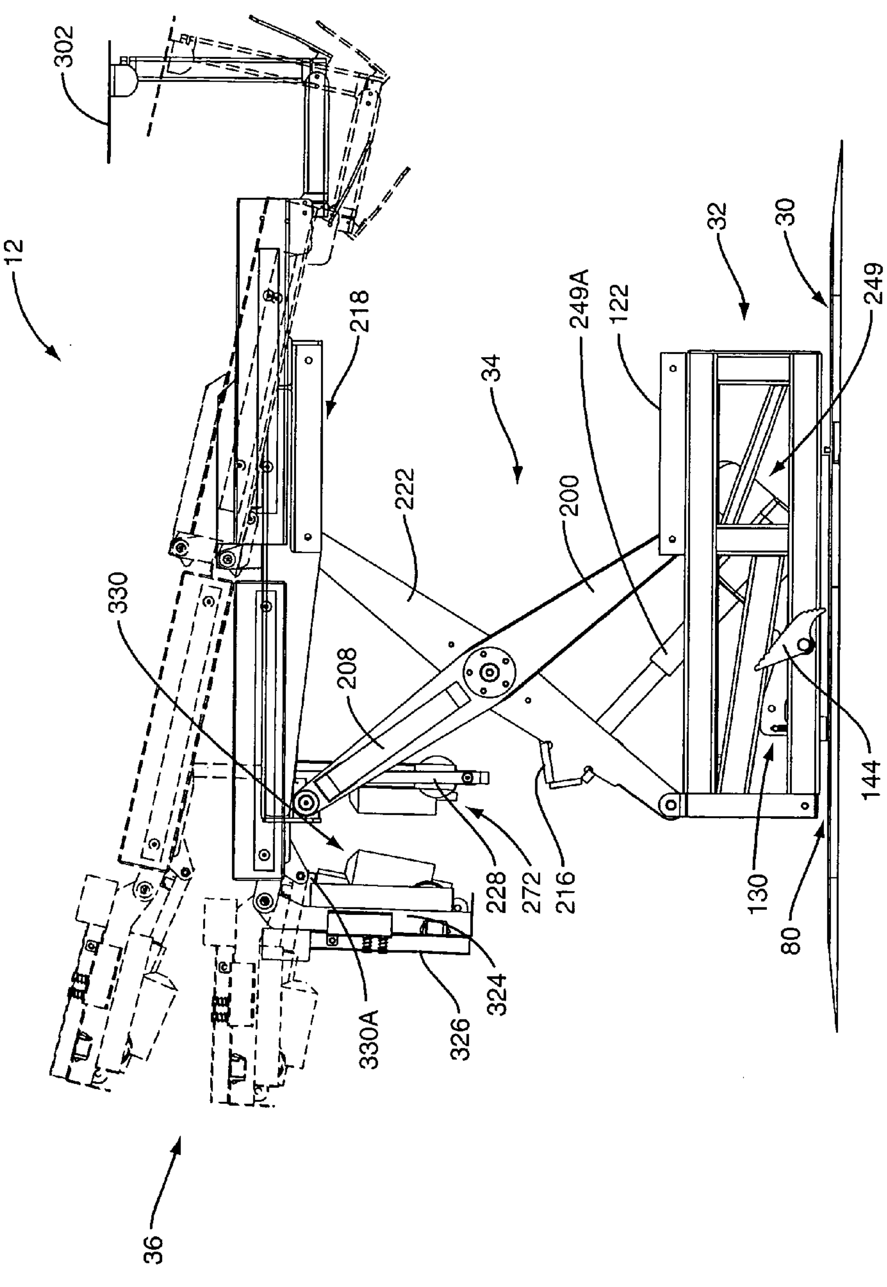
FIG. 7 is a side elevational view of the examination table in an upper position with housing panels removed to better illustrate the same.
Figure 7A:
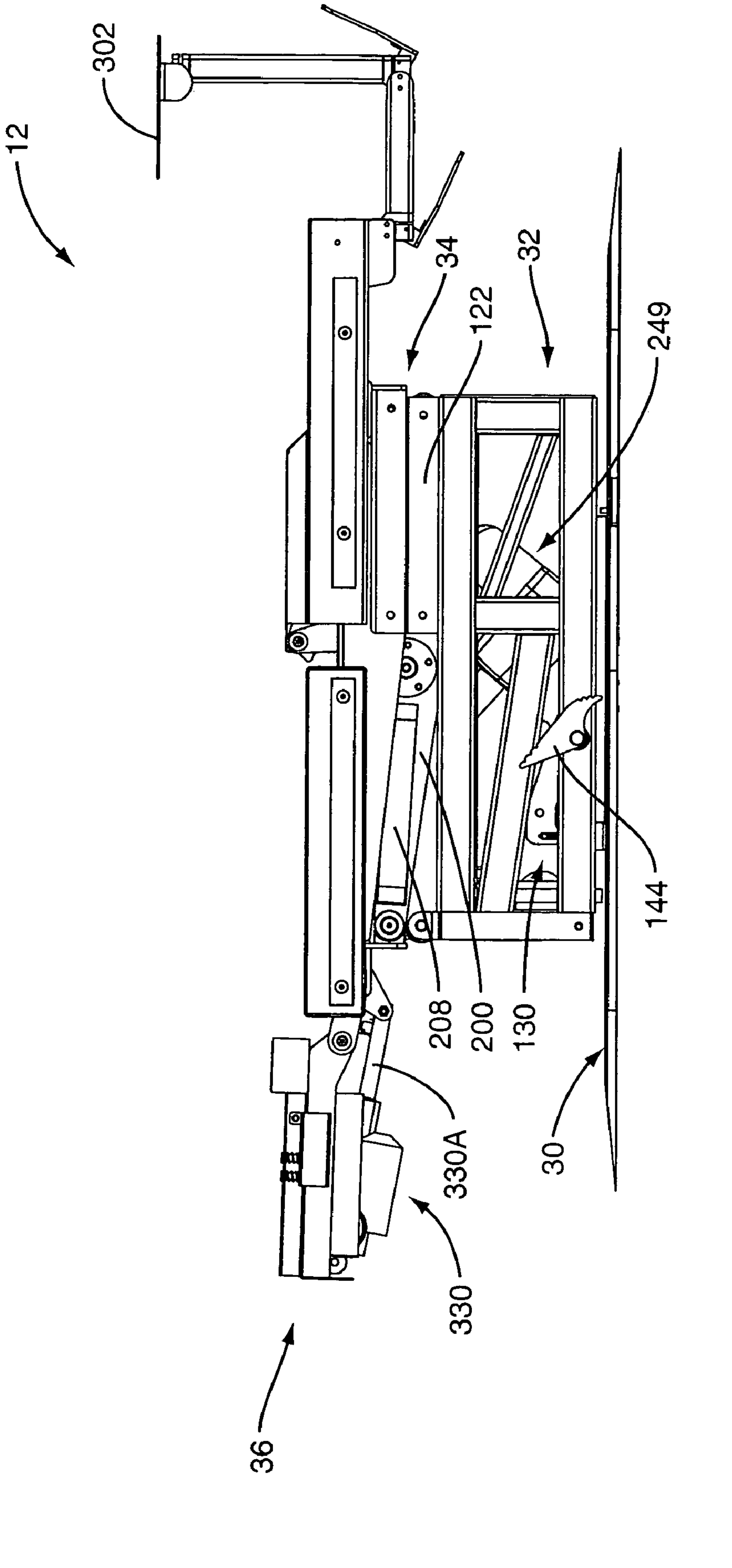
FIG. 7A is similar to FIG. 7 but with the examination table being disposed in a lower position.

To power the lift assembly 34, there is provided one or more actuators for raising and lowering the lift frame 218. Various types of actuators can be utilized including electrical, hydraulic, pneumatic, etc. In the embodiment illustrated herein there is provided two electric actuators 249. See FIG. 5. Each actuator is anchored in the base frame 32 and extends upwardly therefrom to connect to the cross member 216 that extends between the inner arms 220 and 222. Each actuator 244 includes a motor and an extensible rod 249A that is connected to the cross member 216. As the actuators 249 are extended, the arms 200, 202, 220 and 222 are caused to move from a lower general horizontal position to a general vertical position. As the actuators 249 are activated and the extensible rods 249A are extended, the lift frame 218 will move upwardly and during the course of this movement will assume a generally horizontal or level configuration. At the same time, the axis of the central tube 240 that forms a part of the pivot assembly will move generally upwardly without lateral movement. To lower the lift frame 18, the extendable rods 249A are retracted causing the scissor-type lift assembly 34, and particularly the arms thereof, to collapse and assume a generally collapsed or lowered position as shown in FIG. 7A. As discussed below, the examination table includes other actuators for moving certain components of the examination table 12. While these actuators can be of various types, such as mechanical, pneumatic, hydraulic, the actuators shown herein are electric linear actuators that are driven by an electric motor. Such actuators are manufactured by Linak, whose North American headquarters is located in Louisville, Ky.

Examination table 12 is preferably provided with a collapsible housing that surrounds the base frame 32 and the lift assembly 34. Various structures such as accordion type panels or and telescoping plates can be utilized to encase or house these components of the examination table. In the embodiment illustrated in FIG. 1, a series of telescoping panels, indicated generally by the numeral 242, is utilized to house and enclose the base frame 32 and the basic components of the lift assembly 34.

Mounted to the lift assembly 34 is an articulating tabletop that is indicated generally by the numeral 36. See FIGS. 1 and 5. More particularly, articulating tabletop 36 is adapted to be secured to the lift frame 218 and to be supported thereby. As will be evident from subsequent portions of this disclosure, articulating tabletop 36 includes a frame and at least three independently movable sections, sometimes referred to as a back section, an intermediate or seat section, and a leg rest. Because these sections can be moved or articulated independently, the articulating tabletop 36 can assume many configurations such as a horizontal table configuration, a chair configuration or an inclined configuration.

Figure 17:
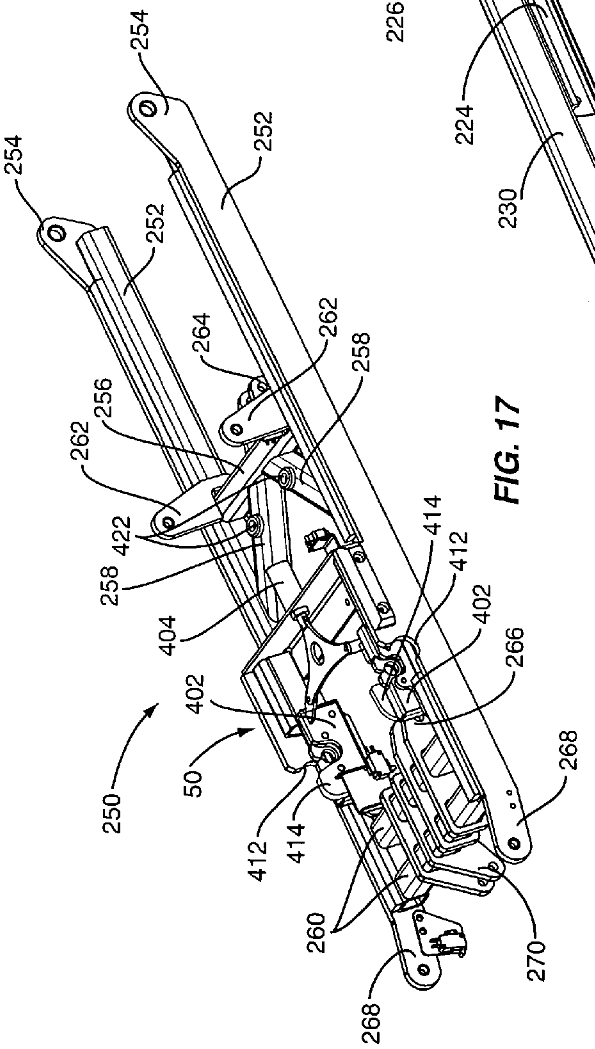
FIG. 17 is a perspective view of a frame structure that forms a part of an articulating table assembly.
Figure 19:
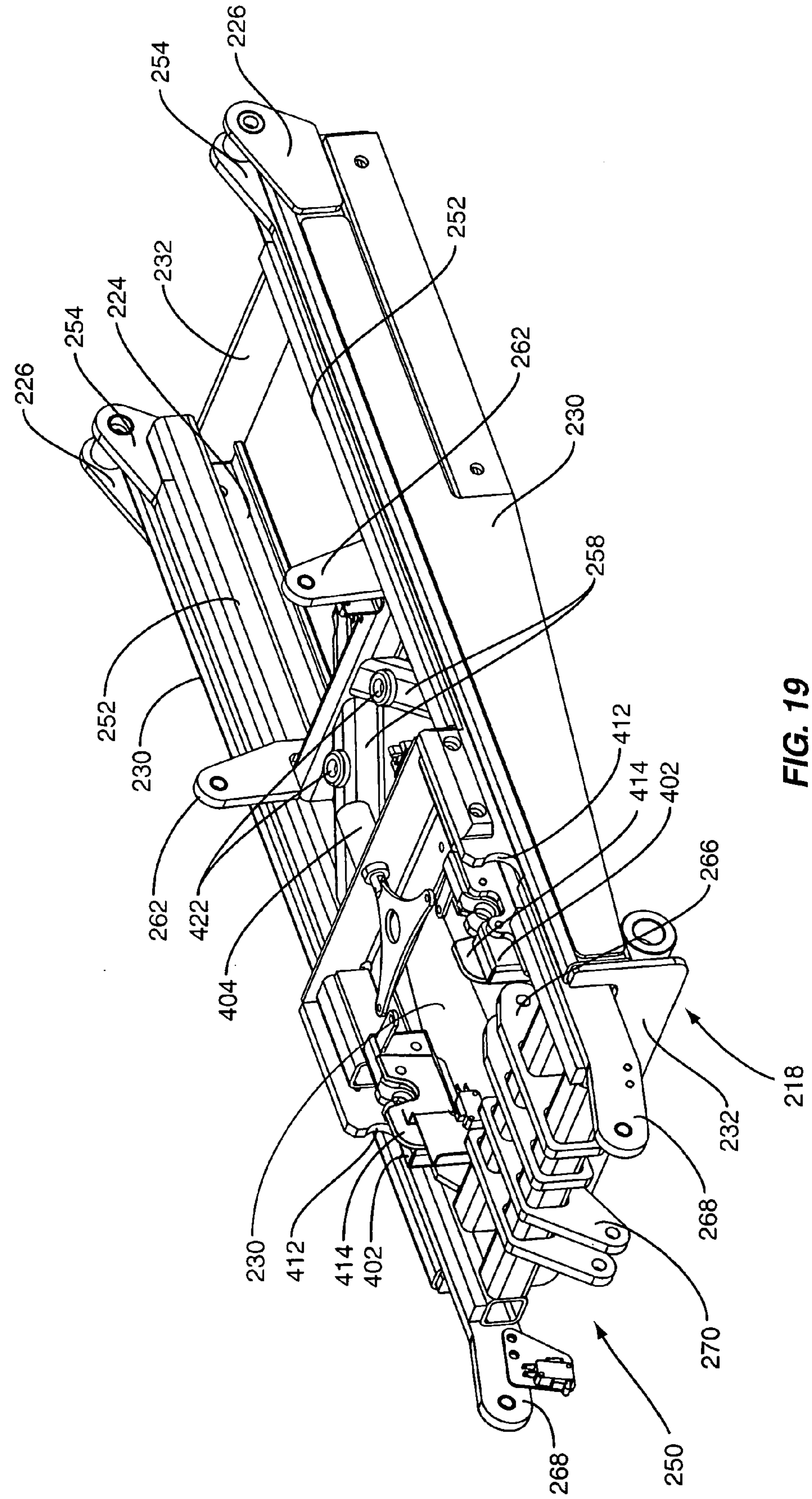
FIG. 19 is a perspective view showing the frame of FIG. 17 inserted and supported in the frame shown in FIG. 18.
Figure 20A:
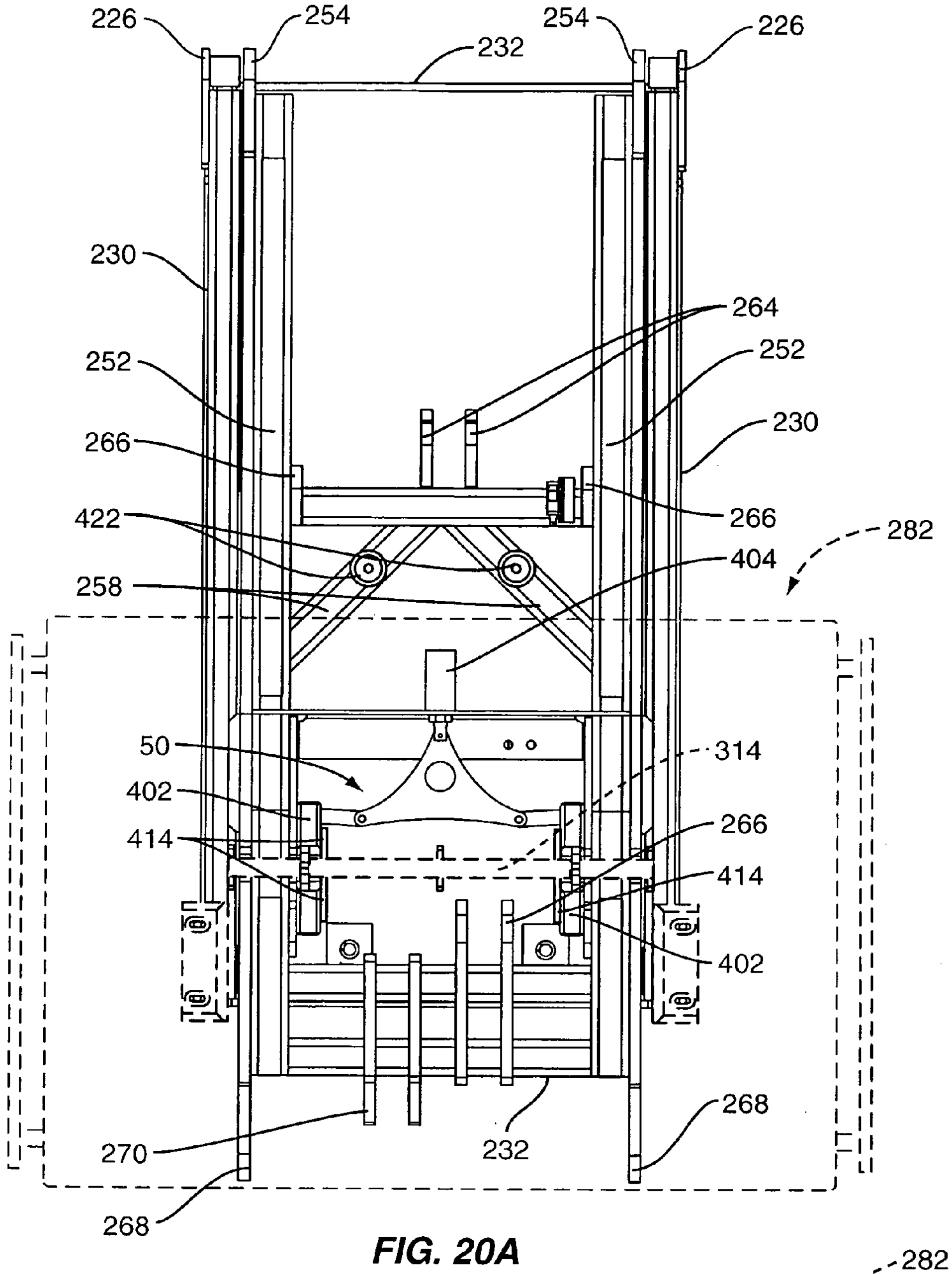
FIG. 20A is a schematic drawing that illustrates the seat section of the examination table being supported on a frame structure.
Figure 20B:
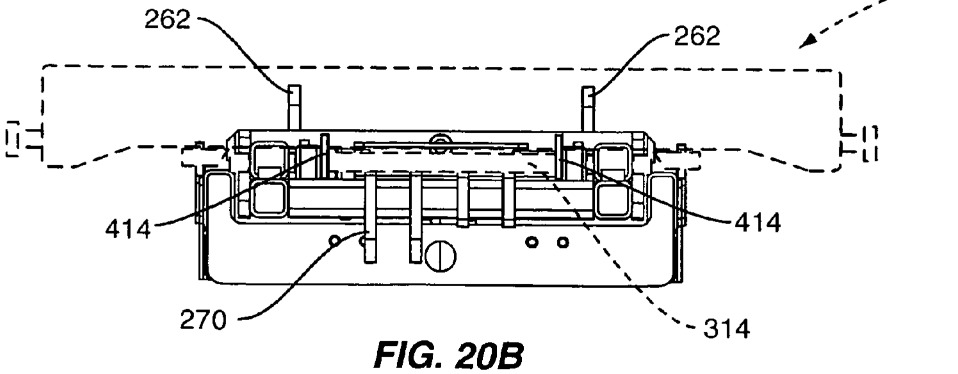
FIG. 20B is an end elevational schematic view showing the seat section supported on the frame structure.

Tabletop 36 includes a frame indicated generally by the numeral 250 and shown in FIG. 17. Frame 250 is designed to fit into lift frame 218 and to be supported thereby. In addition, as will become evident from subsequent portions of this disclosure, frame 250 is pivotally connected about one end of the lift frame 218 such that frame 250 can be moved up and down with respect to the lift frame 218 as illustrated in FIG. 7. With particular reference to FIG. 17, frame 250 includes a pair of spaced apart longitudinal members 252. Longitudinal members 252 are particularly spaced such that the frame 250 can seat and lie within lift frame 218. Note that when frame 250 is seated within lift frame 218, that longitudinal members 252 lie inwardly of members 230 of the lift frame. Provided on the rear end of each longitudinal member 252 is a connector 254. Connectors 254 are in turn pivotally connected to connectors 226 of the lift frame 218. See FIG. 19. More particularly, frame 250 is pivotally connected by pivot pins to the lift frame 218 via connectors 226 such that the entire articulating table 36 can pivot thereabout.

To form a strong and rigid structure, there is provided various intermediate and end bracing for frame 250. In this regard, as illustrated in FIG. 17, there is provided an intermediate cross member 256 that extends between longitudinal members 252. In addition, there is provided a pair of diagonal braces 258 that extend from the cross member 256 to the longitudinal members 252. Further, there are provided two spaced apart cross members 260 that extend between the longitudinal members 252 adjacent the front portion of the frame 250.

Disposed intermediately on frame 250 is a part of the connector or connector assembly 50 that enables the wheelchair 10 to be connected to the examination table 12. Details of this portion of the connector assembly 50 will be dealt with subsequently herein.

As discussed above, there are a series of independent movable sections that form parts of the articulating tabletop 36 and which are secured to frame 250. To accommodate a back there is provided a pair of back connectors 262. Back connectors 262 are spaced apart and extend upwardly from the longitudinal members 252. Disposed adjacent the back connectors 262 is a back actuator connector 264. Also, as discussed above, it is appreciated that frame 250 can pivot up and down with respect to the lift frame 218. Secured intermediately on frame 250 is a connector 266 that, as discussed subsequently herein, connects to an actuator for tilting the frame 250 with respect to the lift frame 218. Formed or provided on the front end of frame 250 is a pair of connectors 268 that attach to a leg rest to be described subsequently herein. Adjacent the leg rest connectors 268 is a connector 270 that connects to an actuator for moving the leg rest.

An electric actuator 272 is interconnected between the lift frame 218 and the frame 250. As illustrated in FIG. 7, the actuator 272 is secured to support 228 that depends downwardly from the lift frame 218. Actuator 272 is connected between support 228 and the connector 266 formed on the frame 250. By extending and retracting the connector 272 the front portion of frame 250 and the articulating tabletop 36 can be moved up and down about the axis of the pivot pins that connect the connectors 254 of frame 250 with the connectors 226 of the lift frame 218.

Turning to FIG. 1, mounted on frame 250 is a back or end section indicated generally by the numeral 280. Pivotally mounted on the opposite end of frame 250 is a leg rest indicated generally by the numeral 284. Secured to the frame 250 between back 280 and leg rest 284 is a removable intermediate section or seat indicated generally by the numeral 282. Both back section 280 and seat section 282 include a pair of toolbars 318 that project from opposite sides thereof.

Figure 3:
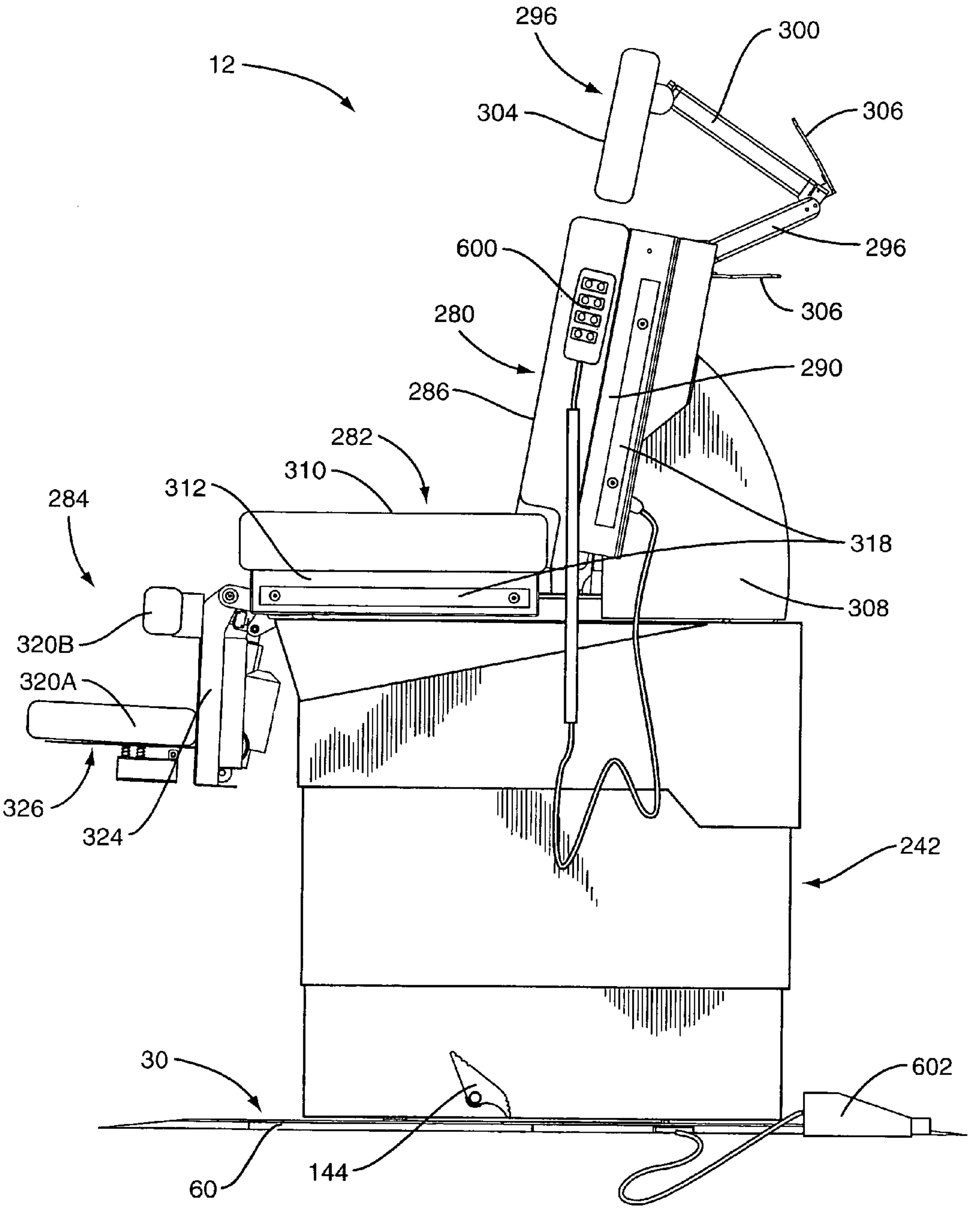
FIG. 3 is a side elevational view of the examination table in an upper position shown in a chair configuration.
Figure 8:
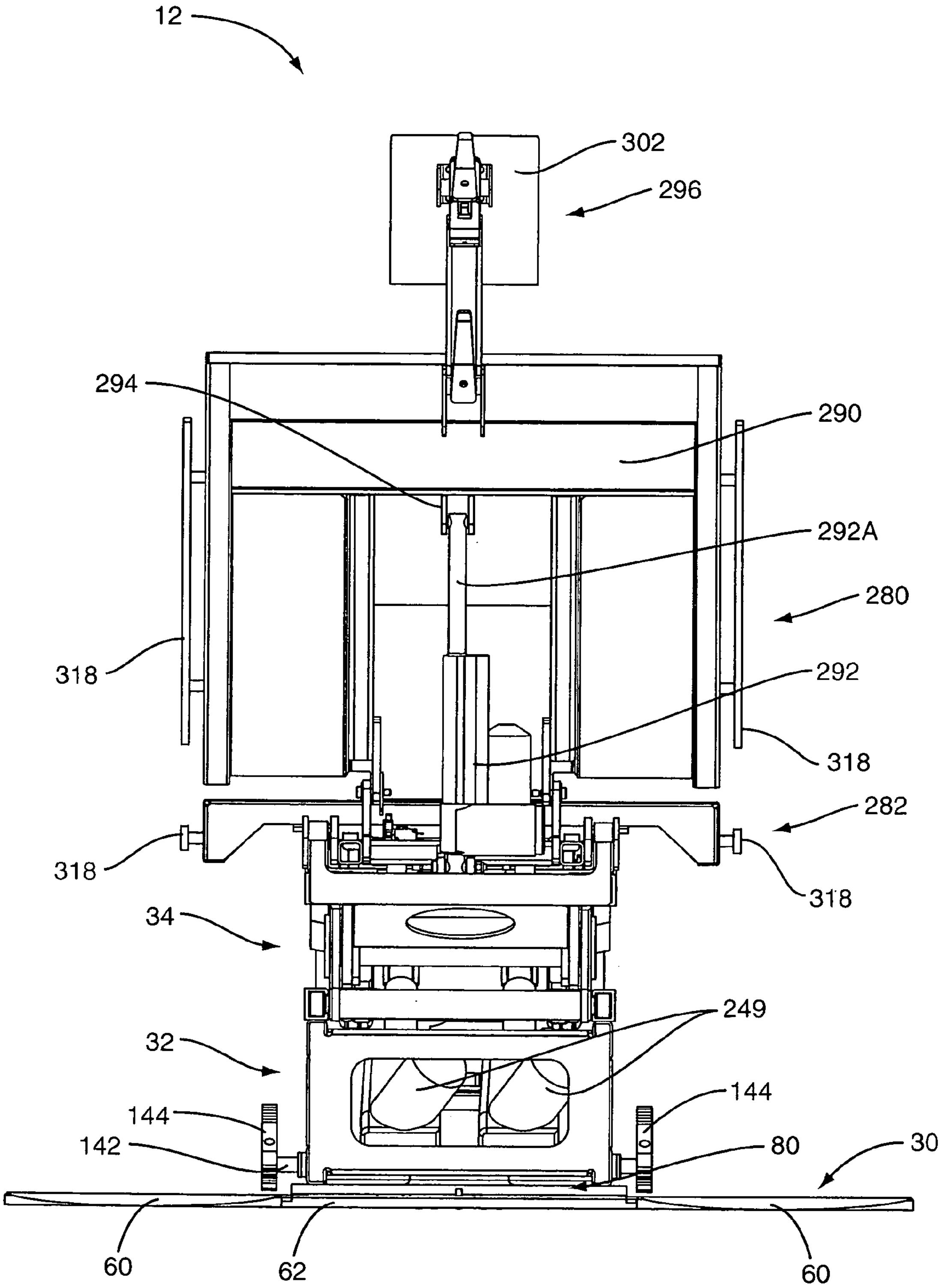
FIG. 8 is a rear elevational view of the examination table showing the back section in an upright position and certain structures removed to illustrate components and features of the examination table.

Viewing back section 280, the back section includes an upholstered side or pad 286. A pair of cavities 288 are formed in the upholstered pad or side 286. As will be appreciated from subsequent portions of this disclosure, cavities 288 function to receive the handles of the wheelchair 10 when the back 502 of the wheelchair is disposed adjacent the back section 280. Underlying the upholstery pad or side 286 is a back frame 290 that could be constructed of various materials such as metal. Back frame 290 is pivotally connected to the connectors 262 of frame 250. This enables back 280 to pivot between a generally horizontal position (FIG. 1) and an upright position (FIG. 3). There is provided an electric actuator 292 for articulating or moving back 280 between the general horizontal and vertical positions. Actuator 292 is illustrated in FIG. 8 and includes an extensible rod 292A. The base of the actuator 292 is pivotally connected to connector 264 and extends therefrom where the rod 292A pivotally connects to a connector 294 that extends from the back frame 290. See FIG. 8. The back or bottom side of metal frame 290 may be enclosed by a panel which could be made of various materials. Such a panel would effectively conceal actuator 292 and other structural components of the back 280. Also, as illustrated in FIG. 3, the back may be provided with a pair of arcuate shaped fins 308. Fins 308 project from back frame 290. When the back section 280 assumes an upright position, the fins are visible and project rearwardly from the back section. When the back section 280 is down or in the horizontal position, fins 308 are concealed by the telescoping panels 242 that generally surround the base frame 32 and the lift assembly 34.

Secured to the back 280 is a headrest indicated generally by the numeral 296. Headrest 296 includes a pair of pivotally connected arms 298 and 300. Secured to arm 300 is a plate 302 that supports an upholstered pad 304. Note that the headrest 296 can be adjusted in various directions with respect to the back 280. This is because arm 298 is pivotally connected to the back frame 290 and arm 300 is pivotally connected to both arm 298 and to plate 302 that supports the upholstered pad 304. Two lever actuators 306 are connected to the headrest 296 and functions to lock the pivotal connections of arms 298 and 300 when the headrest 296 assumes a proper position.

Figure 30:
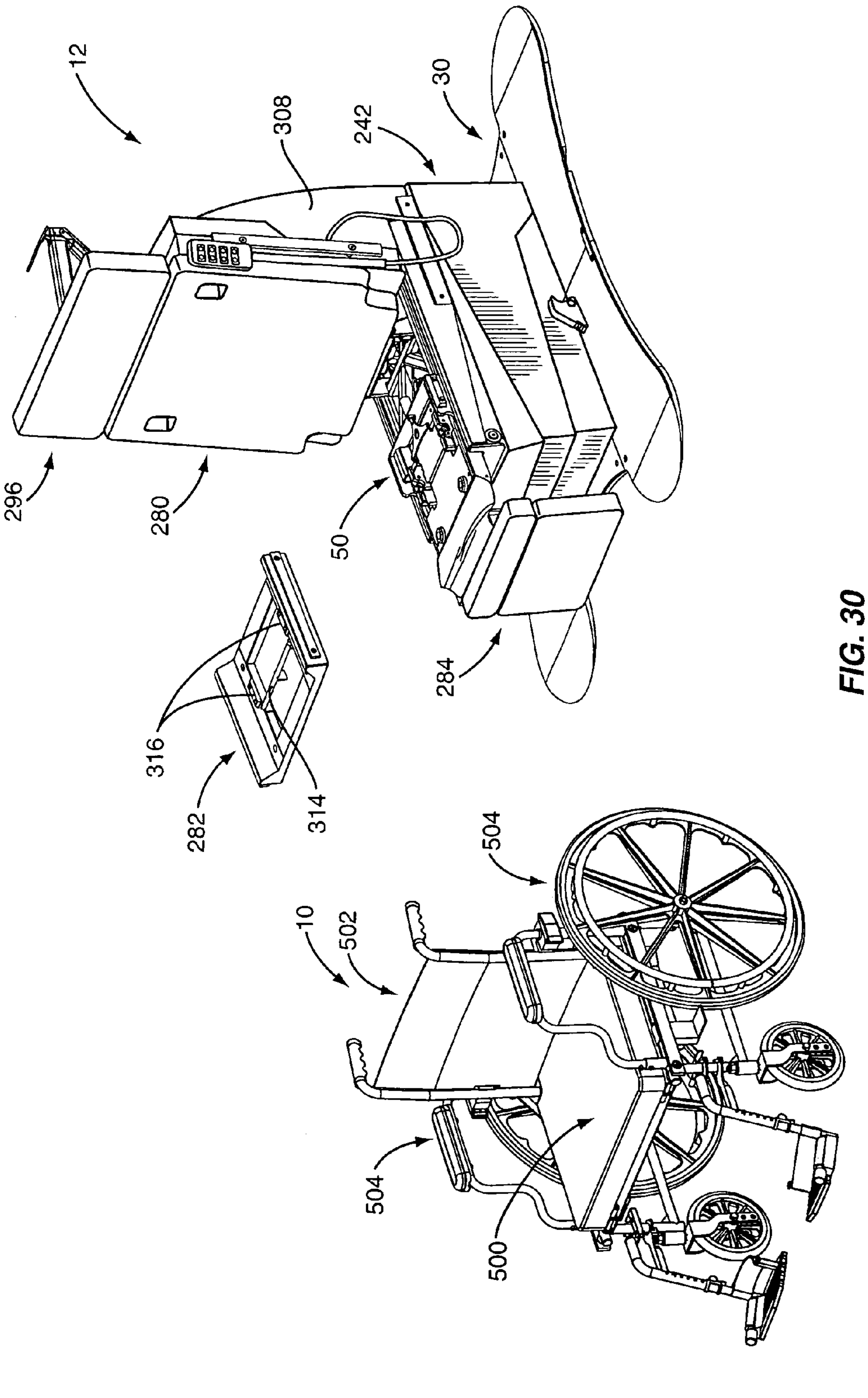
FIG. 30 illustrates the examination table being prepared to connect to the wheelchair.
Figure 31:
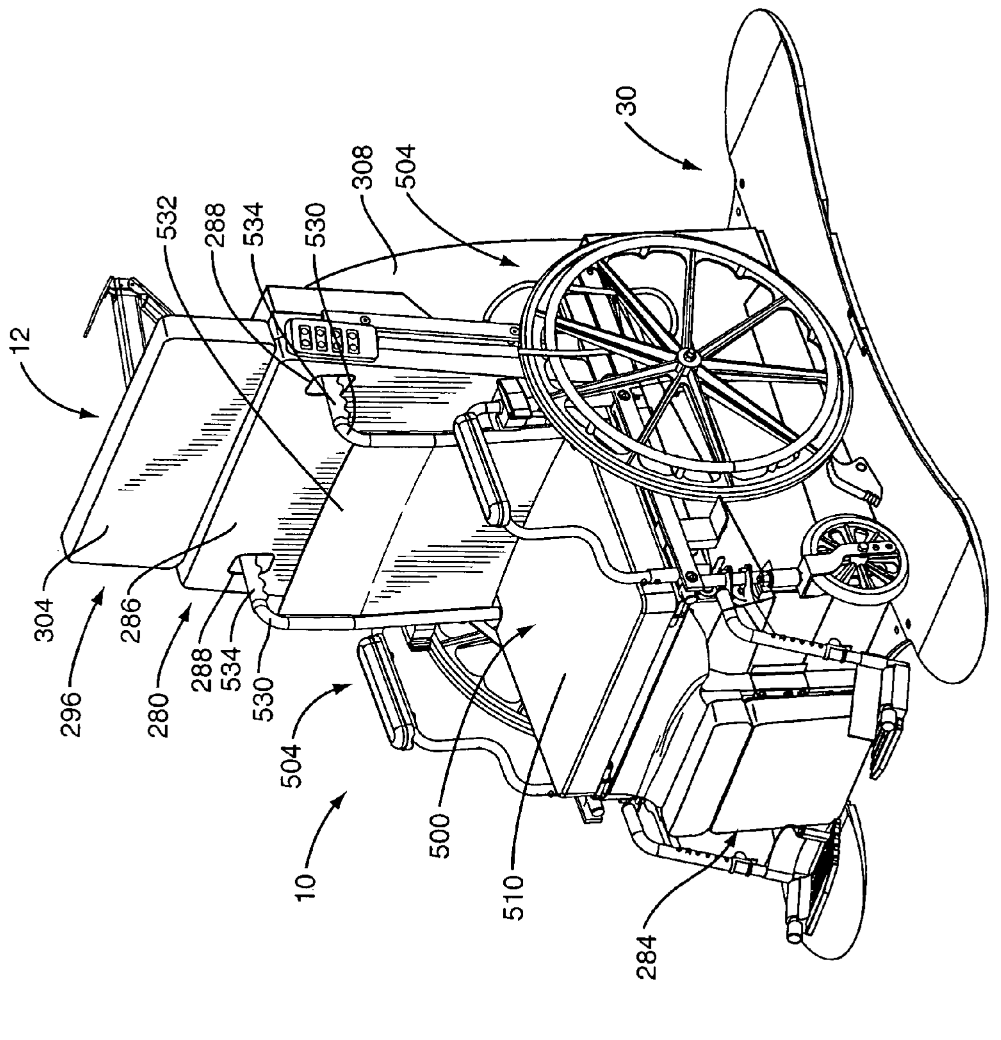
FIG. 31 is a perspective view showing the wheelchair straddling a portion of the examination table.
Figure 32:
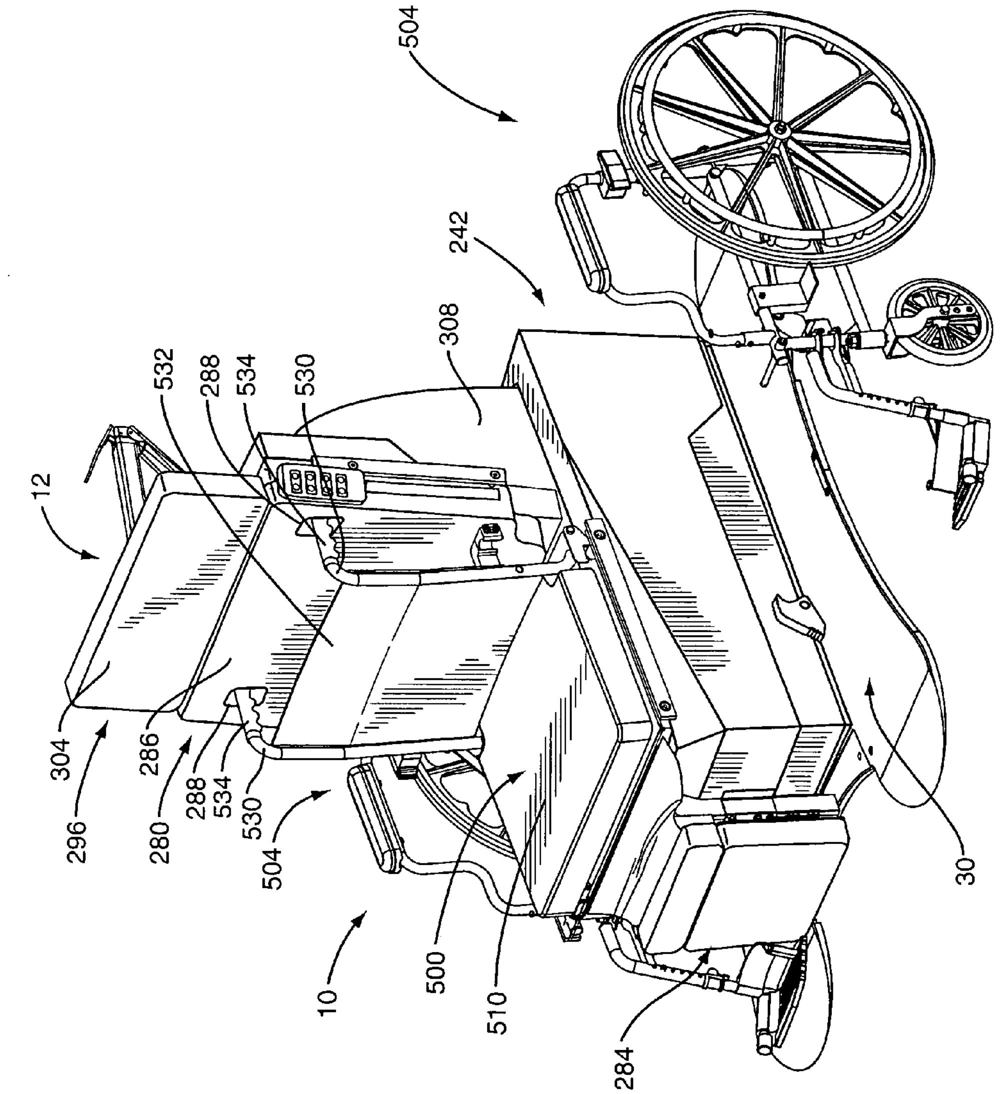
FIG. 32 is a view similar to FIG. 31, but wherein a side frame of the wheelchair has been removed.
Figure 33:
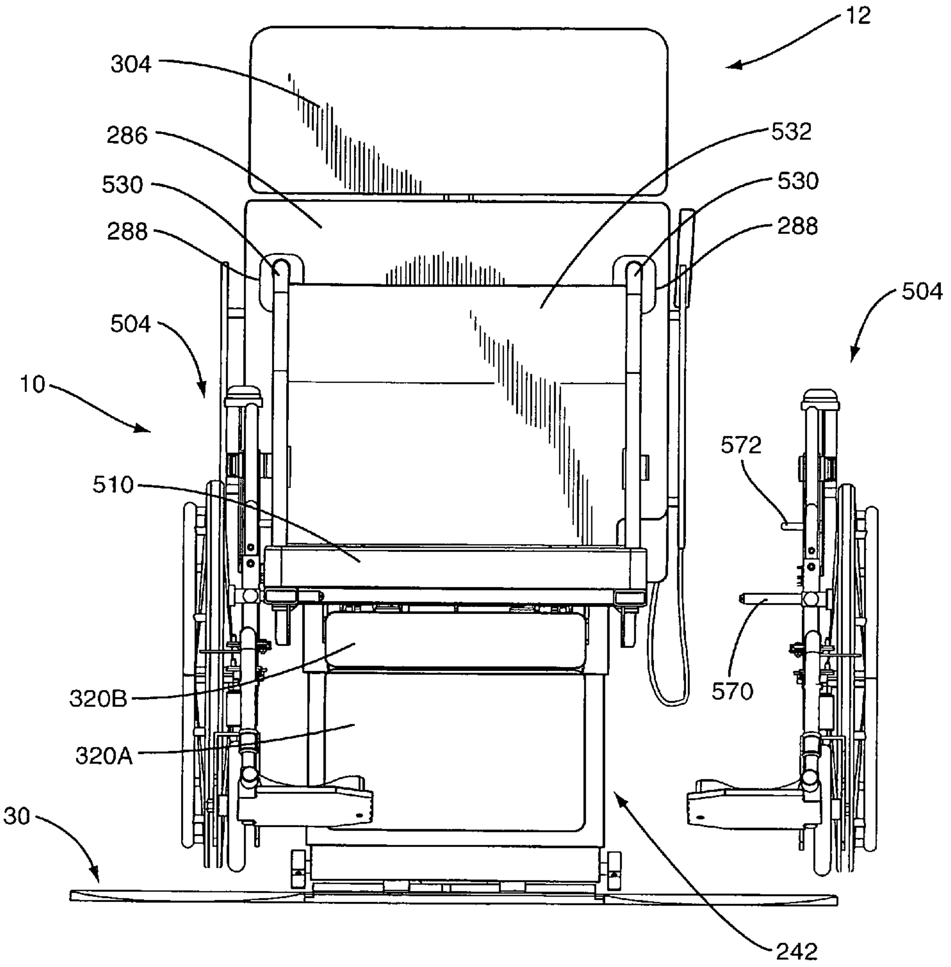
FIG. 33 is a front elevational view showing the wheelchair in a slightly elevated position with one side frame being removed.
Figure 34:
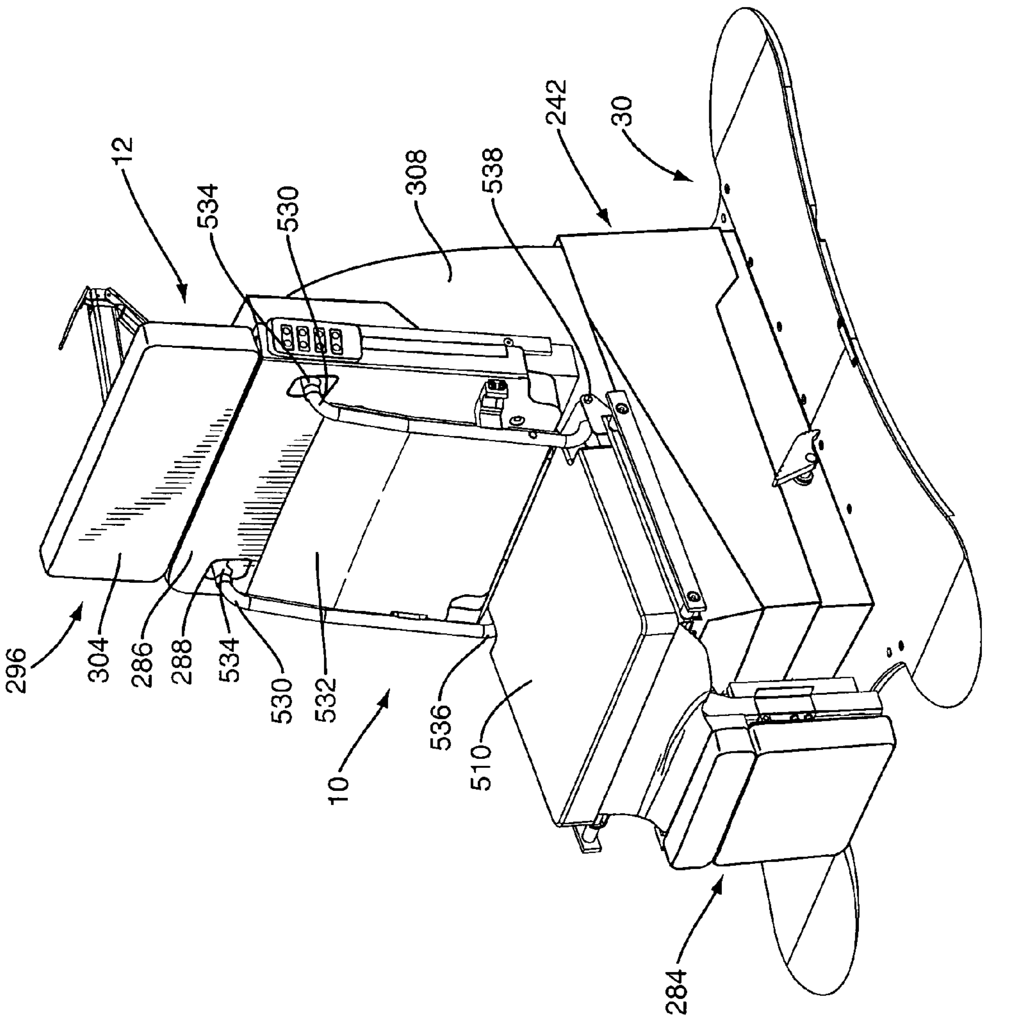
FIG. 34 is a perspective view of the central section of the wheelchair, without the side frames, secured on the examination table.

Secured to frame 250 adjacent to back 280 is another section, sometimes referred to as a seat section, indicated generally by the numeral 282. Seat section 282 is designed to be removable from the frame 250. Seat section 282 includes an upholstered surface or pad 310 and an underlying frame 312. Frame 312 is adapted to be supported on frame 250. More particularly, seat section 282 is provided with a connecting member that connects to a portion of the connector assembly 50 associated with the examination table 12 that is utilized to connect the wheelchair 10 to the examination table 12. See FIG. 30. More particularly, on the underside of frame 312 there is provided a transverse locking member 314. Disposed within the frame 250, in an area underlying the location for the seat section 282, is a portion of the connector assembly 50 that connects to the locking member 314. Hence, in operation, the seat section 282 is normally secured to the frame 250 of the examination table 12 by the same connector assembly 50 that is utilized to secure the wheelchair 10 to the examination table 12. In the embodiment illustrated, the connector assembly 50 includes a pair of locks that actually lock the locking member 314 and seat section 282 to the examination table 12. When the seat section 282 is locked to the frame 250, the bottom of the frame 312 will engage portions of the frame 250 such that the seat section will be stable and firmly secured to the examination table. As illustrated in FIG. 30, the seat frame 312 may be provided with a number of polyethylene pads or blocks 316 which rest on portions of the frame 250 when the seat 282 is locked in position on the frame. As will be explained in further detail, when it is desired to connect wheelchair 10 to the examination table 12, the seat section 282 is removed from the examination table 12, thereby exposing the underlying connector assembly 50.

Continuing to refer to FIG. 1, pivotally connected adjacent the front portion of the examination table 12 is a leg rest indicated generally by the numeral 284. As seen in the drawings, leg rest 284 is pivotable from a retracted position where it assumes a generally vertical orientation to a horizontal position. See FIG. 2. Leg rest 284 includes two upholstered portions 320A and 320B. Underlying the upholstered sections 320A and 320B is a frame structure. This frame structure includes a pair of pivot arms 322 that project from the frame and pivotally connect to arms 268 that project from frame 250.

Figure 23A:
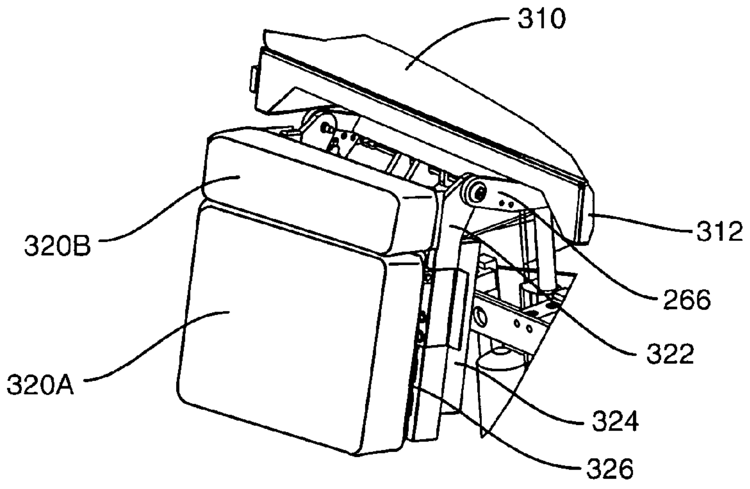
FIG. 23A is a fragmentary perspective view showing the leg rest of the examination table.
Figure 23B:
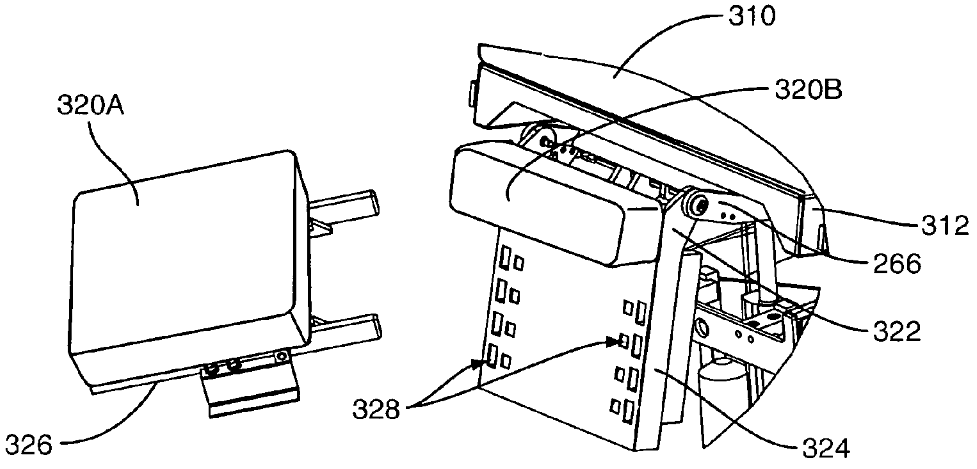
FIG. 23B is a fragmentary perspective view showing one portion of the leg rest being decoupled.
Figure 23C:
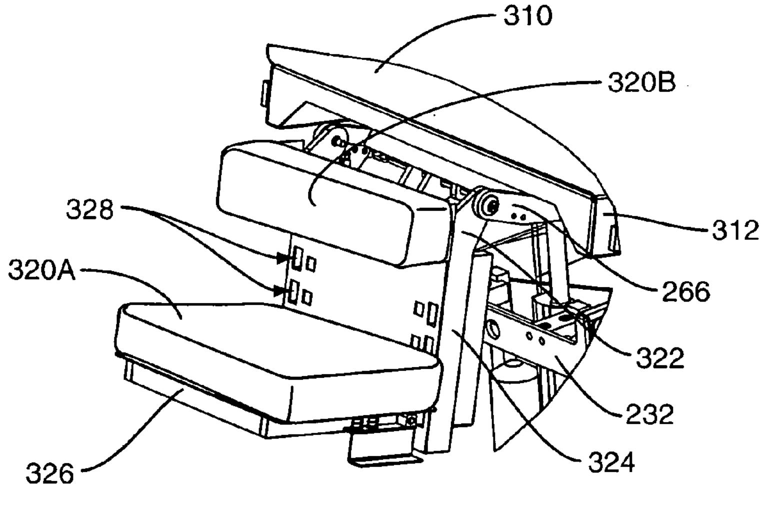
FIG. 23C is a fragmentary perspective view of the leg rest with the decoupled section being mounted in a different configuration.

As seen in FIGS. 23A-23C the frame structure of the leg rest 284 includes a base frame 324 that is pivotally connected to arms 268. Further, the frame structure includes a detachable frame section 326. Detachable frame section 326 has secured thereto the upholstered portion 320A. As illustrated in the drawings, detachable frame section 326 can be decoupled from the base frame 324. When the detachable frame section 326 is removed from the base frame 324 it is seen that the base frame 324 includes a series of spaced apart connection ports 328. The detachable frame section 326 includes a connecting structure that enables the detachable frame section 326 along with its upholstered portion 320A to be secured to the base frame such that the detachable frame section extends in a plane generally perpendicular to the plane of the base frame 324. This is illustrated in FIG. 23C. This enables the leg rest to be used by a patient when the patient is asked to assume an examination position in front of the examination table 12.

To actuate leg rest 284 between the retracted and extended positions, there is provided an actuator 330. As illustrated in FIG. 3, actuator 330 is connected at one end to the connector 270 extending from frame 250 and connected at the other end to the leg rest.

Turning now to the connector 50, as discussed above, the patient examination system of the present invention is designed to enable wheelchair 10 to be connected to the examination table 12, after which the wheelchair 10 can be raised and converted, if desired, to conform to a generally horizontal configuration. See FIG. 35. Connector 50 includes cooperating portions that are associated with both the examination table 12 and the wheelchair 10.

Figure 6:
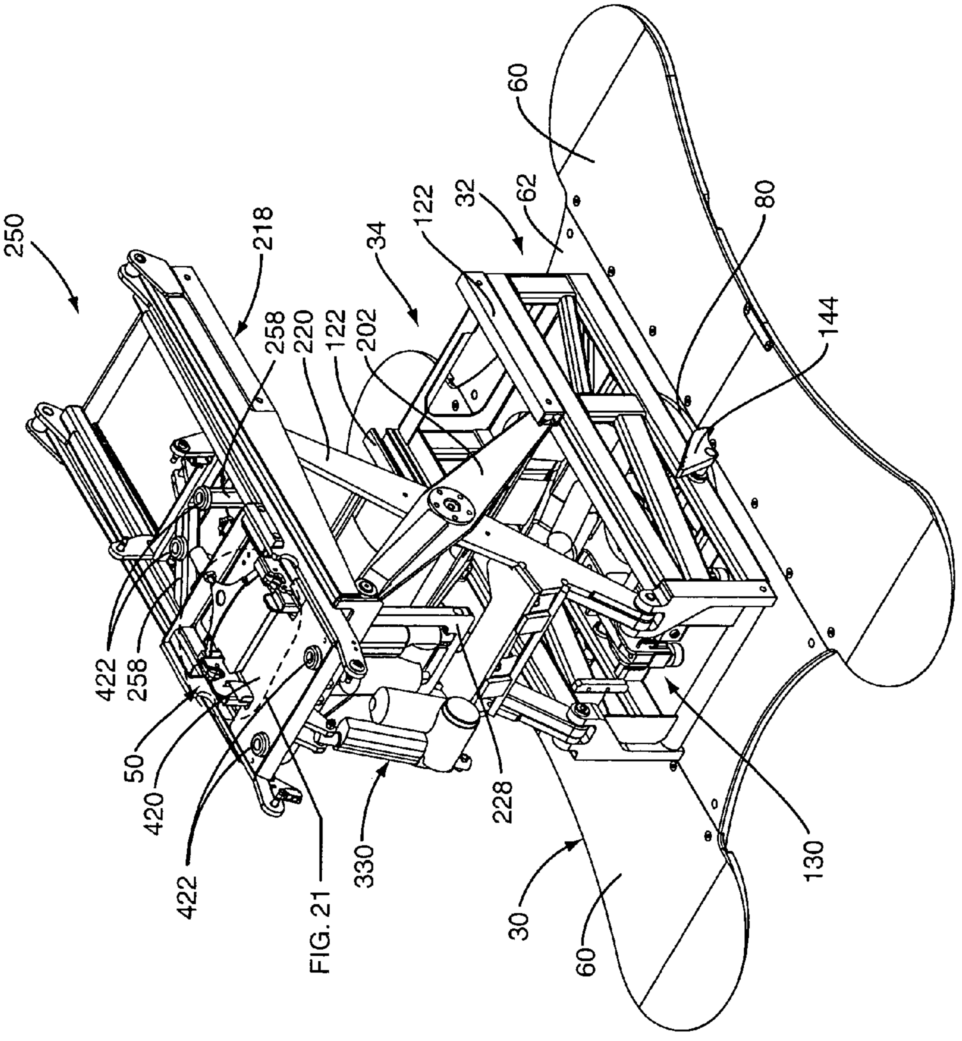
FIG. 6 is a view similar to FIG. 5, but with portions of the articulating table removed to better illustrate certain features of the examination table.

First, viewing the connector 50 as incorporated into the examination table 12, as noted above, a portion of the connector is supported underneath the removable seat section 282. FIGS. 6 and 30 illustrate that portion of the examination table 12. Here the connector 50 includes one or more locks for connecting to member 314 of seat 282 or to a locking member secured on the wheelchair 10. In the case of the embodiment illustrated herein, there is provided two spaced apart locks 402. See FIG. 21. Various types of fasteners, connectors or locks can be utilized. In this case, each lock 402 is a mechanically actuated rotary lock of a design commonly used as car door locks. These types of locks are manufactured, for example, by Southco of Concordville, Pa. Each lock 402 includes a pair of cooperating jaws 402A and 402B. Jaws 402A and 402B of each lock move between open and closed positions. In an open position, the jaws 402A and 402B are rotated or otherwise moved such that they are open from the top. See FIG. 22A. In the closed position, the two jaws assume generally C-shaped configurations and abut such that an opening defined between the two jaws is closed. See FIG. 22C.

Figure 4:
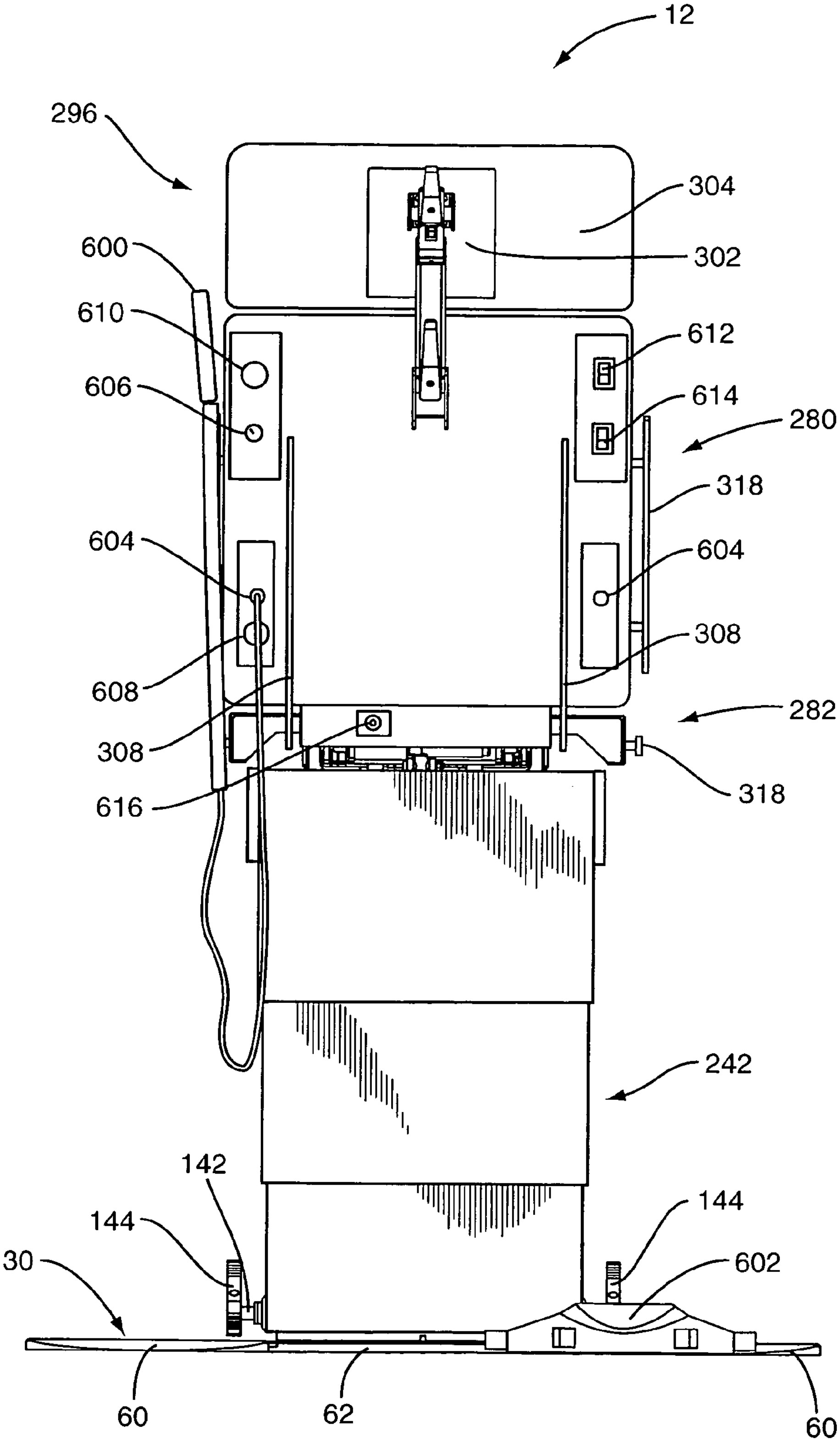
FIG. 4 is a rear elevational view of the examination table shown in FIG. 3.

The locks 402 could be normally closed or normally opened. In the embodiment illustrated herein it is contemplated that the locks 402 will be normally closed and will be open electrically through a solenoid 404. See FIG. 17. Connected directly or indirectly to the solenoid 404 is a plate or connector 406. Extending from each lock 402 is a finger 408. Plate 406 is connected to the two fingers 408 by a pair of pins 410. Hence, by actuating the solenoid 404, the fingers 408 extending from the locks 402 are moved causing the locks 402 to assume an open position. A manual override is provided for unlocking locks 402 in the event solenoid 404 fails. As seen in FIG. 4, a manual actuator 616, which is operatively coupled to the locks 402, extend from the examination table 12. By manually manipulating actuator 616, the locks 402 can be opened. When in the open position, the locking member or locking shaft associated with the wheelchair can be inserted into the locks 402, and more particularly into the open jaws 402A and 402B of each lock. Various means can be provided for closing the locks 402. In the embodiment illustrated herein, the locks 402 are adapted or designed to be closed in response to a downward force being applied to the locks. Thus, as will be described subsequently herein, the locks 402 can be closed by raising the examination table 12 and engaging the locks 402 with the locking member of the wheelchair 10 and continuing to raise the examination table such that the weight of the wheelchair 10 and the weight of the patient are sufficient to close the locks 402.

Figure 21:
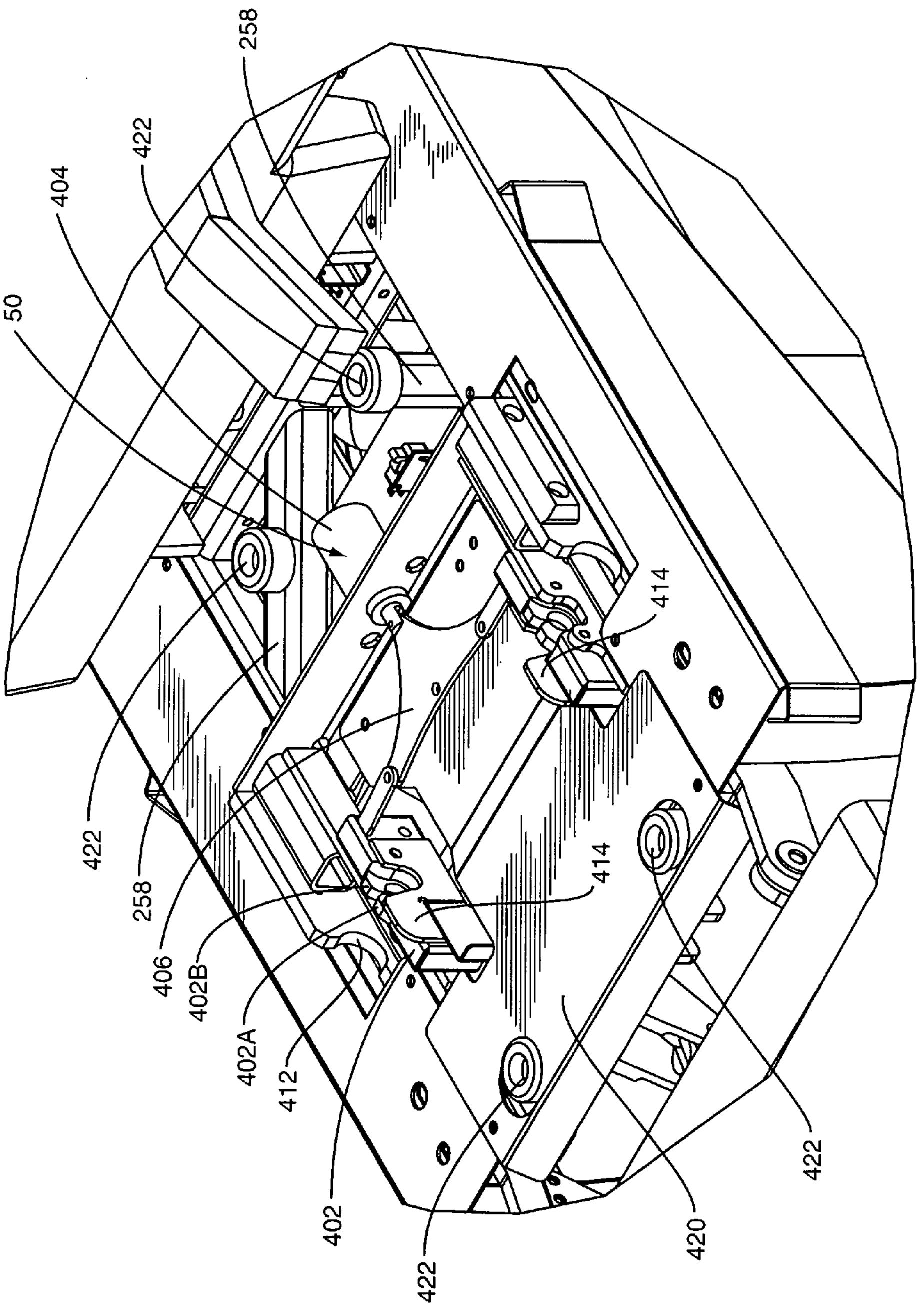
FIG. 21 is a fragmentary perspective view illustrating a portion of the connector assembly associated with the examination table that connects the examination table to a wheelchair.
Figure 22A:
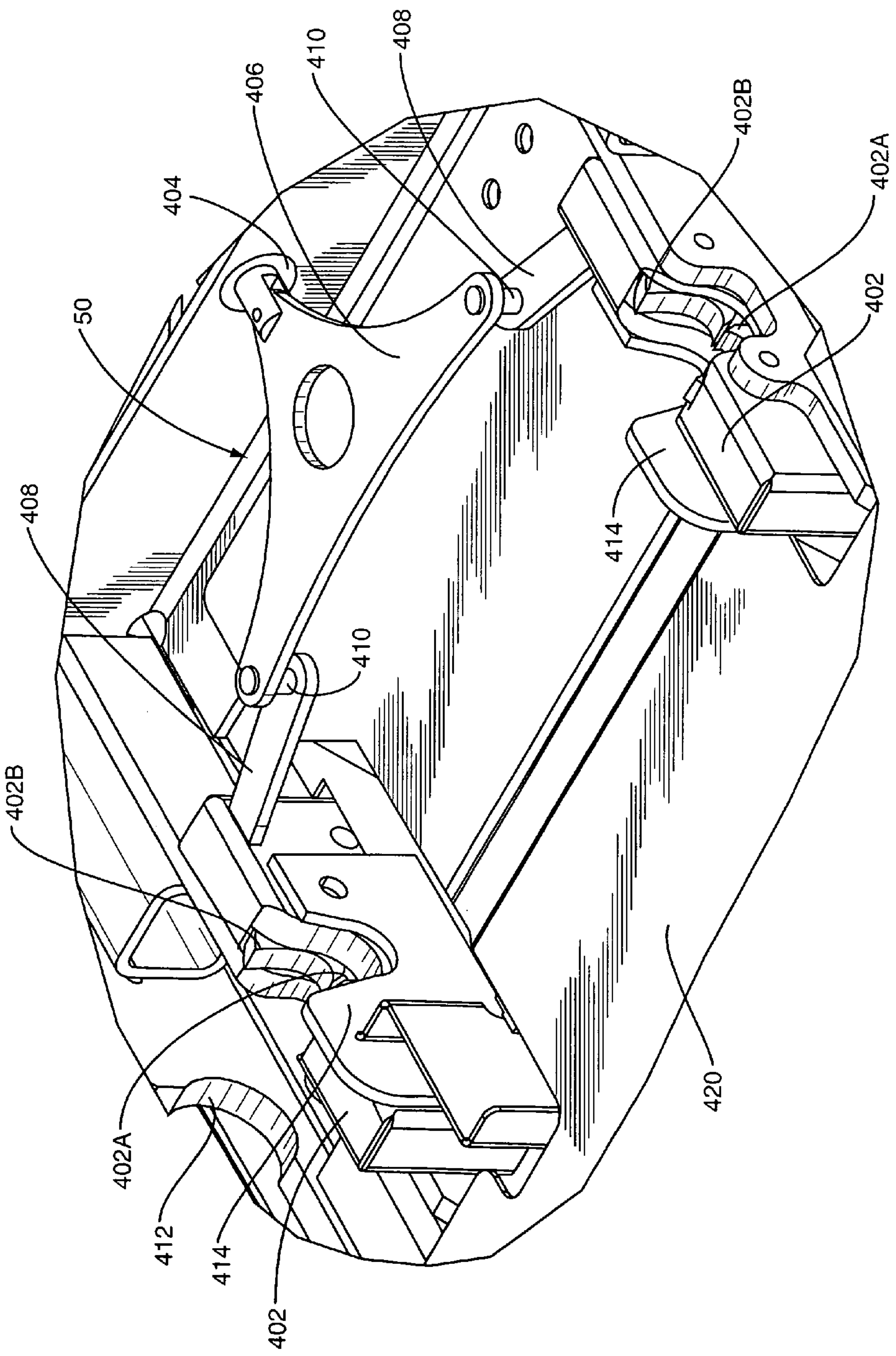
FIG. 22A is a fragmentary perspective view showing the connector assembly of FIG. 21 wherein the locks thereof are in an open or unlocked position.
Figure 22B:
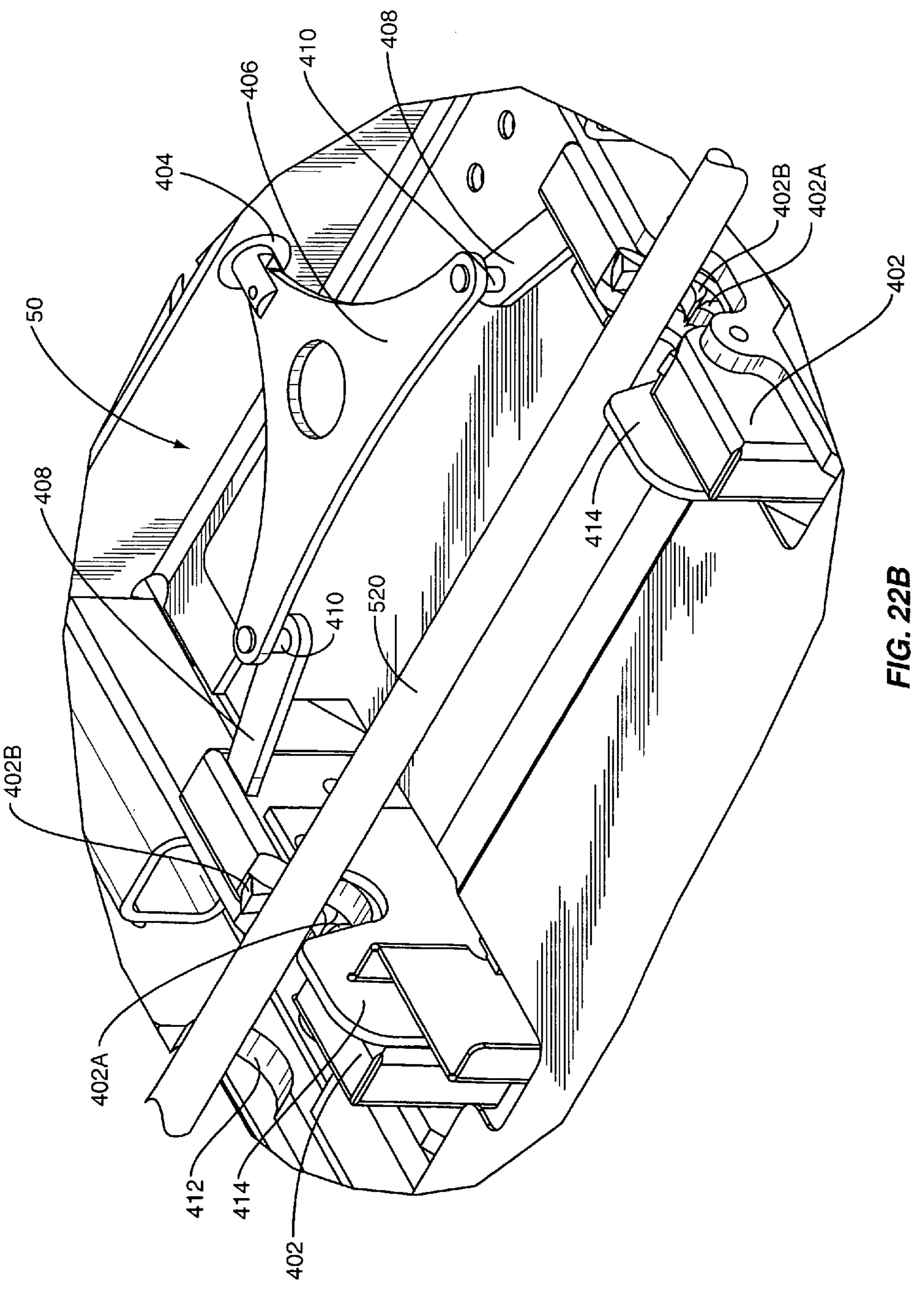
FIG. 22B is a fragmentary perspective view similar to FIG. 22A wherein the locking member of the wheelchair is aligned with the underlying locks of the connector assembly.
Figure 22C:
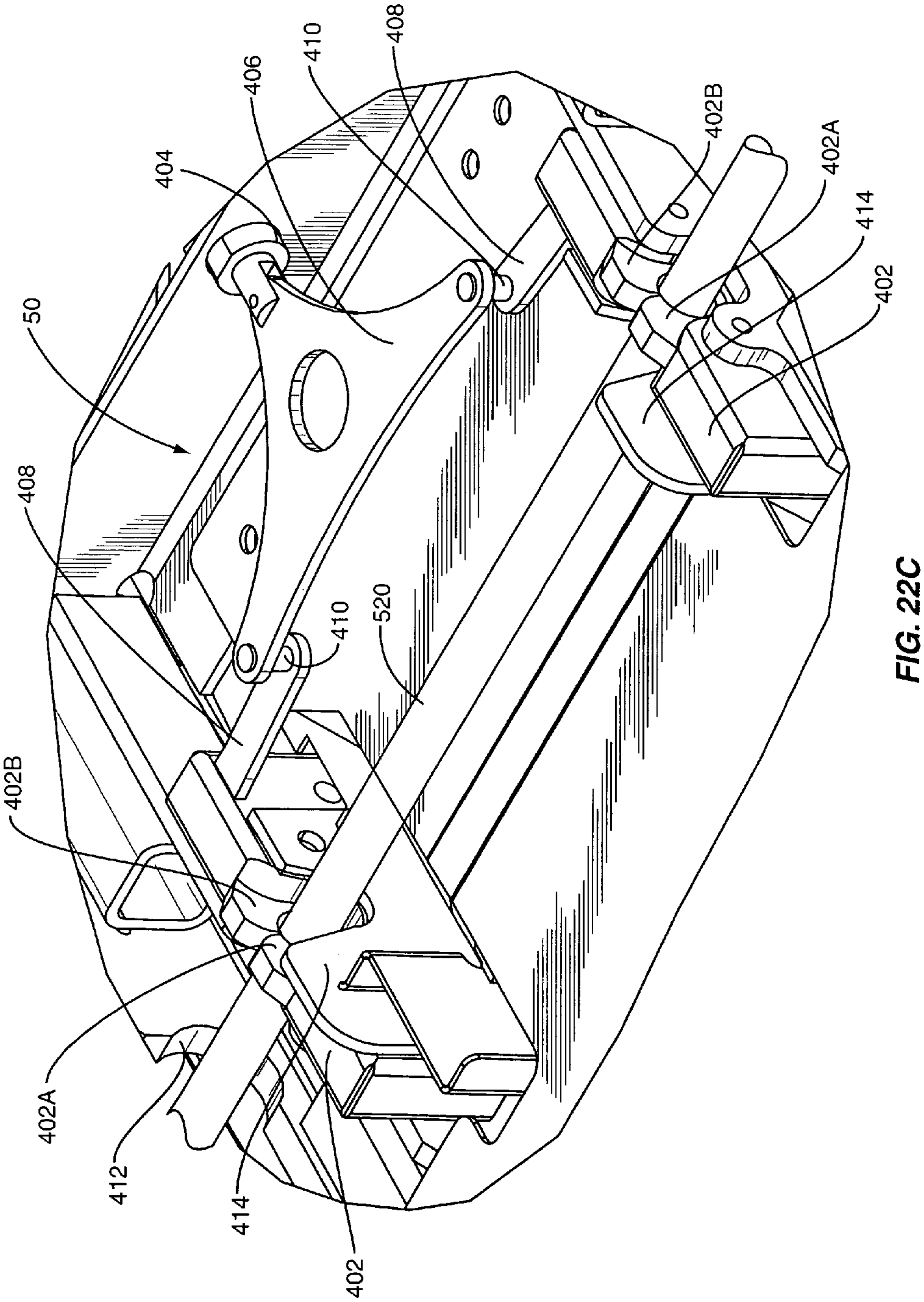
FIG. 22C is a fragmentary perspective view showing the locking member of the wheelchair locked into the locks of the connector assembly associated with the examination table.

As seen in FIG. 17, the rails or longitudinal members 252 of frame 250, extend adjacent the locks 402. Each rail 252 is provided with a cutout adjacent one of the locks 402. This cutout forms a stop 412. Stop 412 is particularly positioned with respect to the locks 402 to act as a stop for the locking member associated with the wheelchair 10. That is, the stops 412 are positioned such that when the locking member engages the stops 412, the locking member should be aligned with the locks 402. In addition, prior to locking, the locking member 520 of the wheelchair 10 will be disposed over the open locks 402. Locking the locking member 520 of the wheelchair 10 in the locks 402 is achieved by moving the locks upwardly into engagement with the locking member. In some cases the locking member and locks may not be precisely aligned. To address this possibility, each lock is provided with a vertical guide structure to guide or funnel the locking member into the locks 402. As seen in FIG. 21, each lock 402 is provided with a pair of finger guides 414 that project upwardly from the locks 402 and diverge. Each pair of guide fingers 414 will engage the locking member of the wheelchair and urge the locking member and locks 402 into alignment as the locks approach the locking member. A shield or plate 420 is mounted on the forward end of frame 250, adjacent the connector assembly 250. See FIG. 6. Secured on shield 420 is a pair of spaced apart rubber or resilient bumpers 422. Also there is provided another pair of bumpers 422 secured to the diagonal braces 258 of frame 250. All four bumpers 422 provide bearing points for both the seat sections 282 and the wheelchair 10 when the wheelchair is mounted to the examination table 12.

Wheelchair

The wheelchair 10 of the present invention is shown in FIGS. 24-28. Wheelchair 10 is a convertible wheelchair that basically comprises a central section that includes seat 500 and a back 502. As will be appreciated from the drawings and subsequent discussion, back 502 is movable with respect to the seat 500, and hence the seat and back can assume different configurations. In addition, wheelchair 10 includes a pair of removable side frames 504. As will be described later, each side frame 504, which includes two wheels, an arm rest and a footrest, can be entirely removed from the wheelchair, essentially leaving the seat 500 and back 502. When wheelchair 10 is coupled to examination table 12, the removal of the side frames 504 substantially facilitates the examination of a patient.

Seat 500 includes an upholstered portion 510. Underlying the upholstered portion 510 is a frame, which in the preferred embodiment is constructed of metal. The metal frame underlying the upholstered portion 510 includes a back connector 512 for connecting to the back 502. In addition, the metal frame includes a bottom plate 514 and a surrounding frame 516. Formed in each side of the metal frame is a series of locking pin sleeves 518 that are utilized to secure the side frames 504 to the seat 500 and the back 502. See FIG. 28. When the wheelchair 10 is supported by the examination table 12, the surrounding metal frame 516 may engage and rest on portions of the frame 250 in the area where the locks 402 are located. To facilitate the movement of the seat frame over frame 250 of the examination table 12, a pair of polyethylene blocks 524 is secured to the bottom of the wheelchair 10. In addition, a striker or sensor 526 is mounted to the underside of the wheelchair. Striker or sensor 526 is particularly positioned on the wheelchair to act as a control point when connecting the wheelchair to the examination table 12. Unless striker or sensor 526 is properly positioned and makes contact with a control switch or other type of sensor, the examination table 12 is precluded from raising and causing the wheelchair to be connected thereto.

As discussed above, wheelchair 10 is designed and adapted to be connected to the examination table 12. To achieve this, in one embodiment, the wheelchair is provided with a locking member 520 that forms a part of the connector 50. In this case, locking member 520 includes an elongated shaft that is welded or otherwise secured to the bottom plate 514. Elongated member 520 is spaced downwardly from the plate 514 sufficient to enable the jaws 402A and 402B of the locks 402 to grab and surround the locking member 520.

Wheelchair 10 is provided with a pair of guides 522 that facilitate positioning the wheelchair 10 over the examination table 12. Each guide 522 projects downwardly from the seat 500 and includes flared end portion 522A. Guides 522 are transversely spaced so as to lie just outwardly of the longitudinal members 252 of the frame 250 when the wheelchair 10 is positioned over the locks 402. Hence the function of the guides 522 is to align the wheelchair 10 with the connector 50 disposed in frame 250. Thus, when moving the wheelchair over the examination table, the guides 522 will assure that the rails 252 of frame 250 are projected between the guides 522. Thus, as the wheelchair 10 is rolled back to its connecting position with respect to the examination table 12 the guides 522 may slightly engage members 252 and guide the wheelchair 10 into the connecting position such that the locking member 520 will be aligned with a pair of locks 402.

Turning to back 502, the back includes a pair of frame members 530. A back support 532 extends between the frame members 530. Formed or provided on the upper ends of frame members 530 is a pair of handles 534. Formed or provided about the lower end of each frame member 530 is a curved finger 536 that includes a pair of opposed stub shafts 538 projecting outwardly from opposite sides thereof. Also formed in each frame member 530 is a pin aperture 542.

Figure 25:
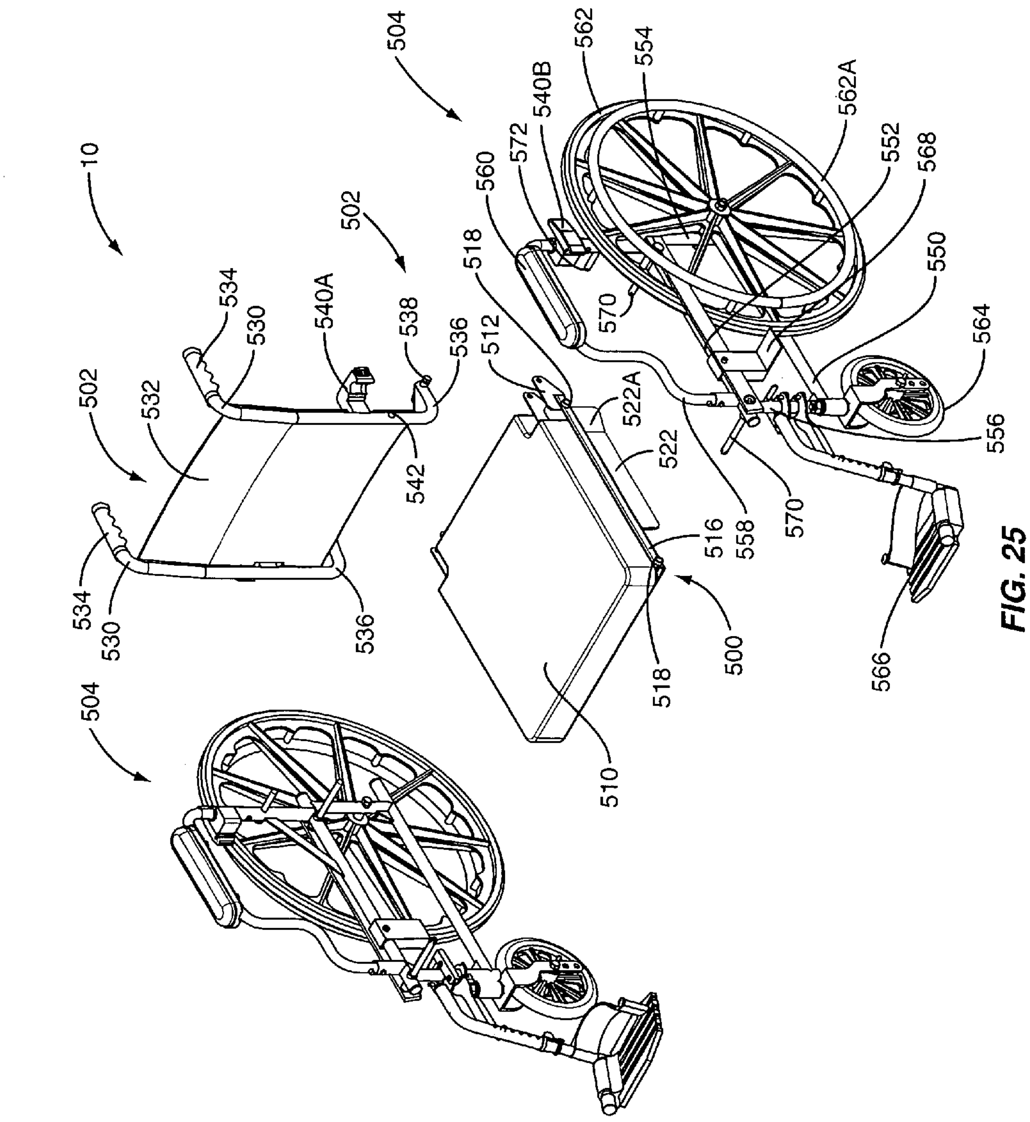
FIG. 25 is an exploded perspective view of the wheelchair.
Figure 26:
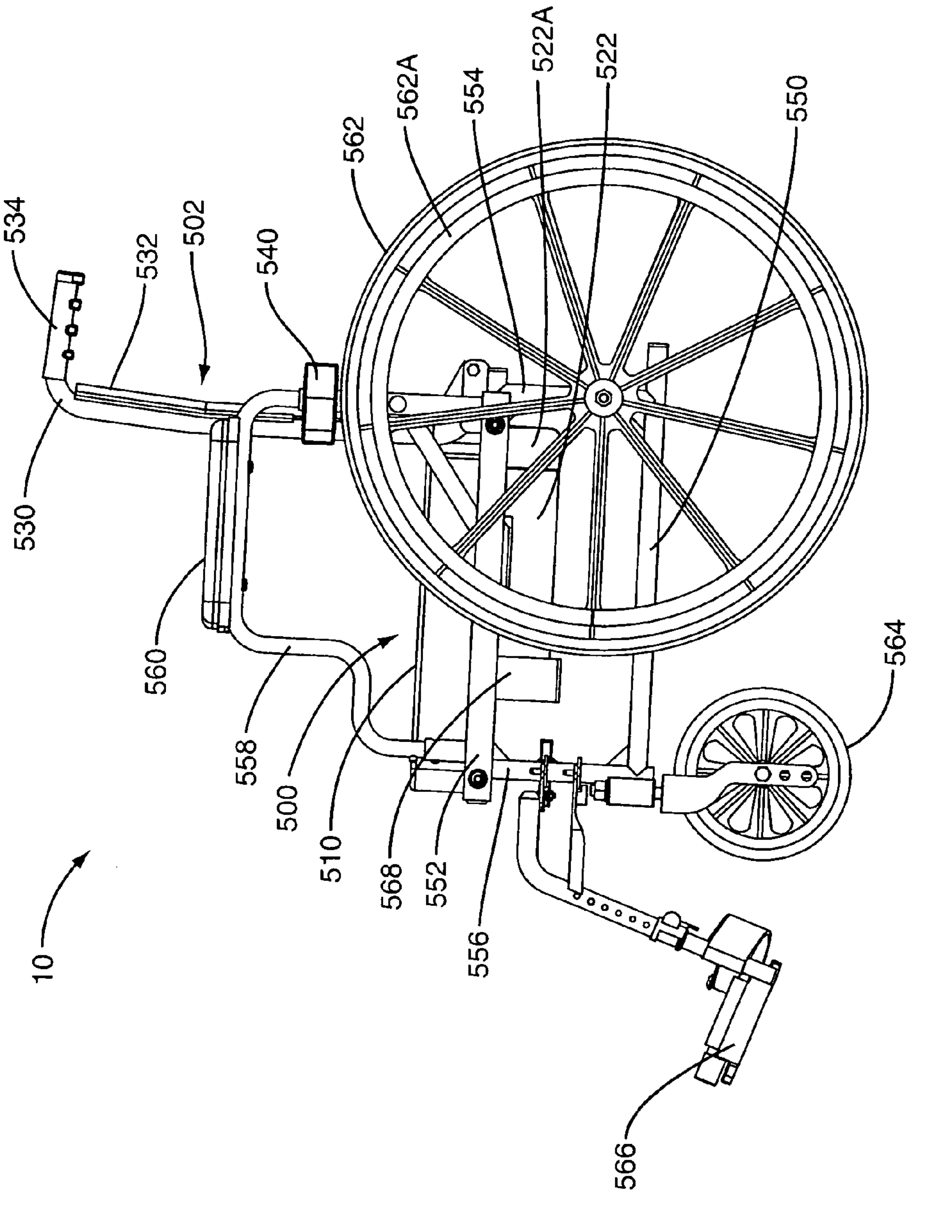
FIG. 26 is a side elevational view of the wheelchair.
Figure 27:
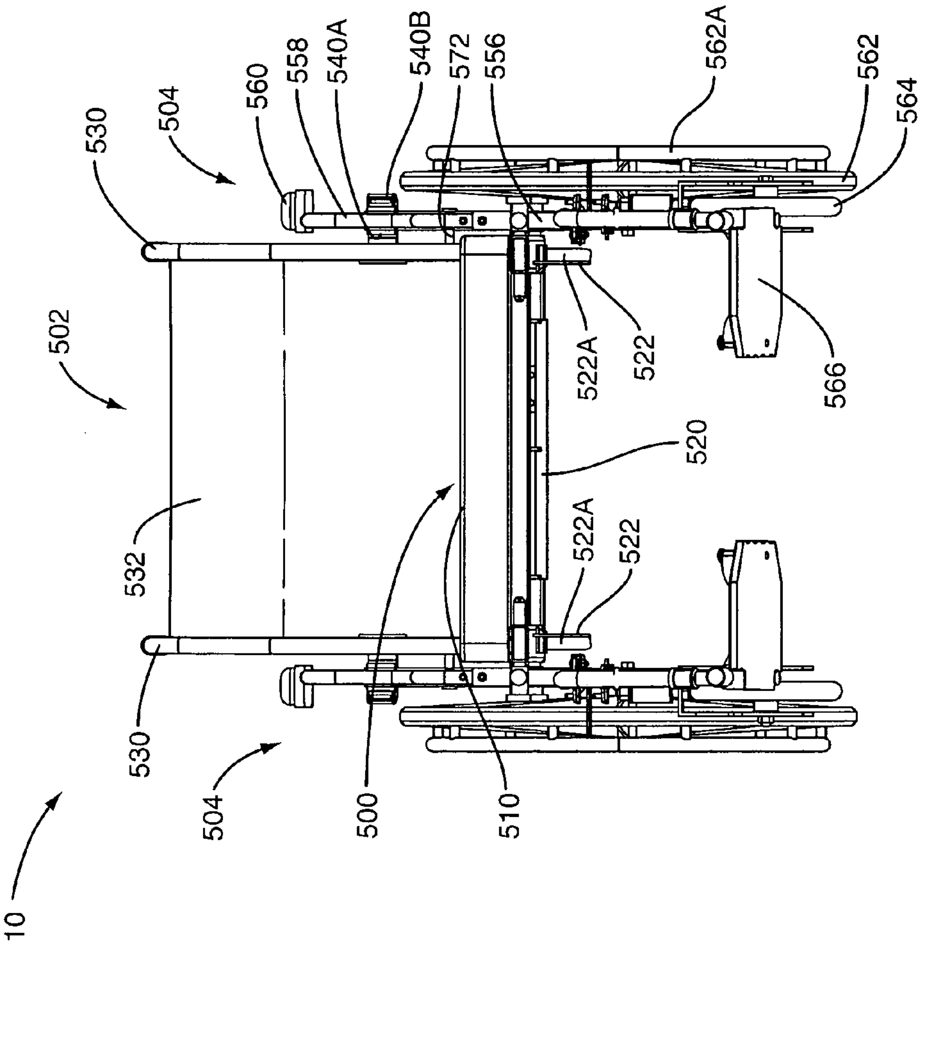
FIG. 27 is a front elevational view of the wheelchair.
Figure 28:
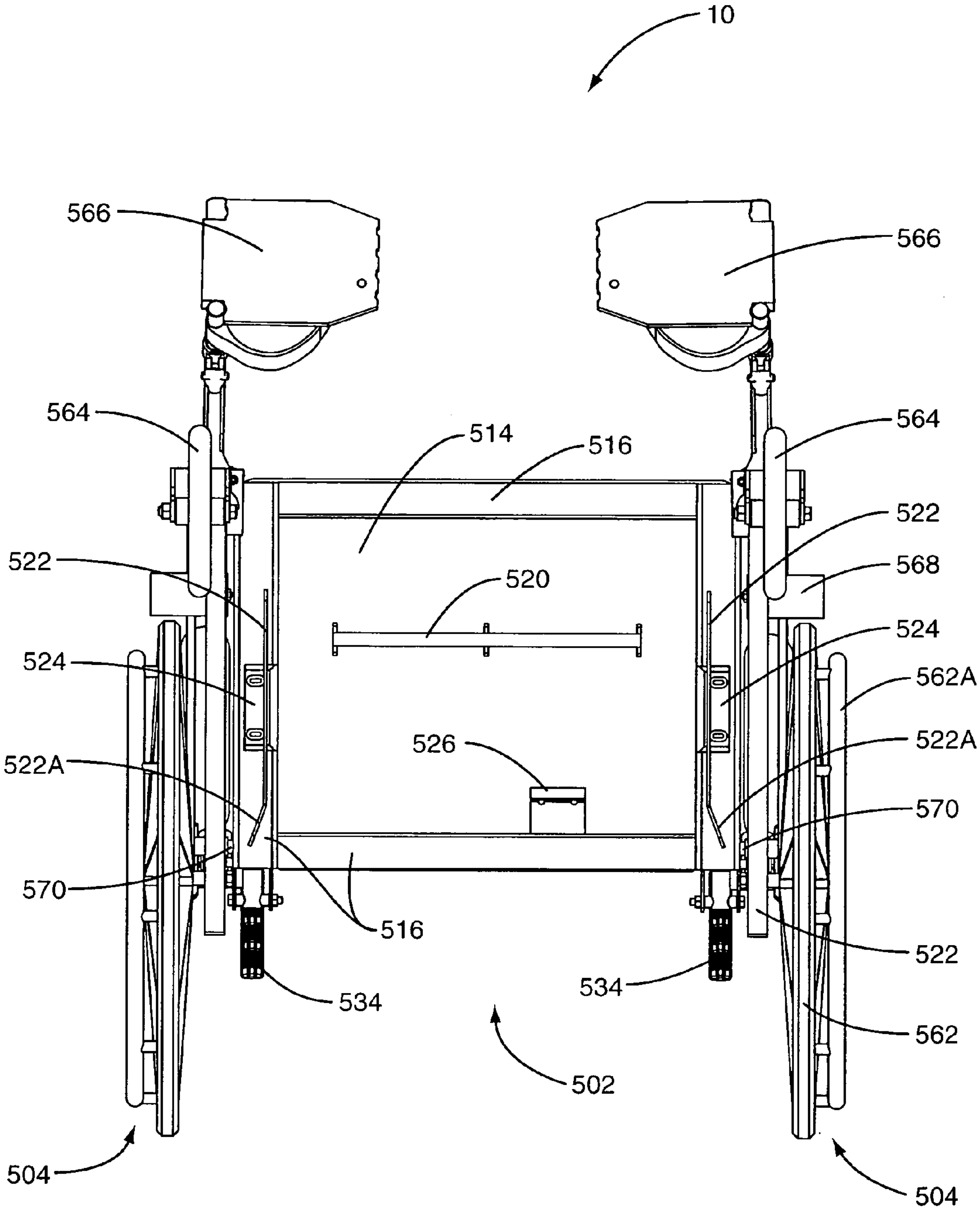
FIG. 28 is a bottom plan view of the wheelchair.
Figure 29:
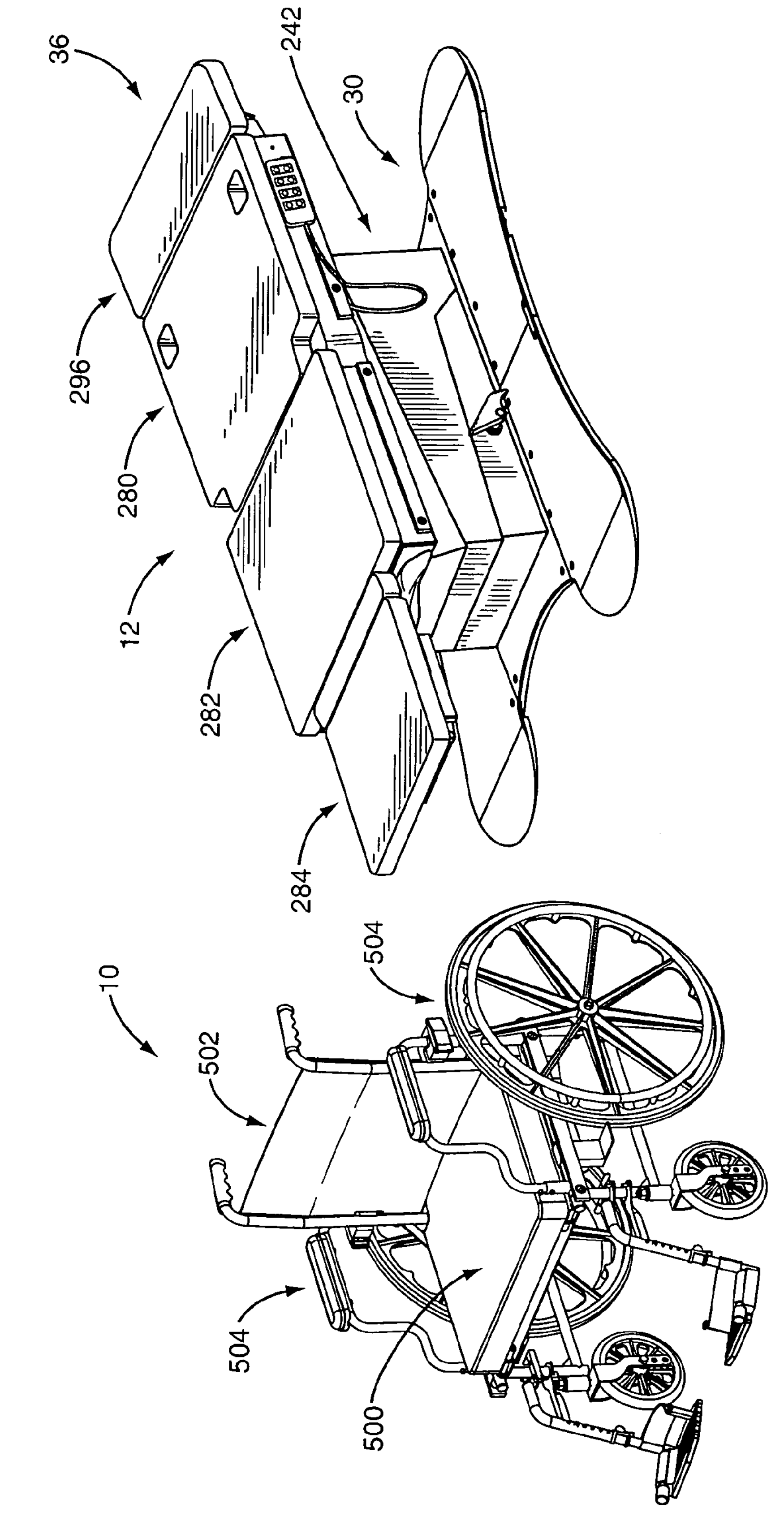
FIG. 29 illustrates the position of the wheelchair with respect to the examination table just prior to the wheelchair being connected to the examination table.

As seen in FIG. 25, the back 502 is designed to be connected to the side frames 504. In particular, each frame member 530 of the back 502 is coupled to a respective side frame 504 via a connector that in the case of this example is comprised of components 540A and 540B. Connector component 540A is secured to a respective frame member 530, and as will be discussed subsequently, connector component 540B is secured to a respective side frame 504 and is adapted to connect to component 540A.

Each side frame 504 includes a lower horizontal member 550 and an upper horizontal member 552. Connecting the horizontal members 550 and 552 is a rear vertical member 554 and a forward vertical member 556. An armrest frame 558 extends across the top of each side frame 504 and includes an armrest pad 560 secured thereto. A main wheel 562 is rotatively mounted at the rear lower corner of the side frame 504. Main wheel 562 includes a hand ring 562A that extends around the outer periphery thereof. In addition to the main wheel 562, each side frame 504 includes a front caster wheel 564. Projecting forwardly from each side frame 504 is an adjustable footrest 566. Secured to the upper horizontal member 552 is a conventional wheelchair brake 568.

Each side frame 504 is detachably mounted to the central section of the wheelchair 10. That is, one or more connectors are utilized to detachably connect each side frame 504 to the central section of the wheelchair. Various types of connectors can be used. The term "connector" used in describing the connection between the side frames 504 and the central section, does not mean or encompass a permanent connection, but means a connection that is designed to quickly and easily allow the side frames to be detached from the central section, or attached to the central section. To accomplish this in one embodiment, each side frame 504 includes a series of locking pins 570 that project inwardly from the side frame. Each locking pin 570 is designed and spaced to project into a locking pin sleeve 518 formed or provided in the seat frame. Details of the locking pins 570 are not dealt with herein in detail because such pins are known and are commercially available. Suffice to state that once the locking pins 570 are inserted into the locking pin sleeves 518, the locking pins 570 will assume a locked position and will securely connect the associated side frame 504 with the seat 500. Locking pins 570 can be released by pressing a button or actuator that permits the locking pins 570 to be retracted from the pin sleeves 518.

To properly align each side frame 504 with the seat 500 and back 502, each side frame is provided with a position pin 572 that in the case of this embodiment, is positioned on the rear vertical member 554. Positioning pin 572 is designed to project into a pin aperture 542 provided the frame 530 in the back 502.

When side frames 504 are connected to the central section of the wheelchair 10, in this embodiment, there are three attaching or connecting points on each side of the wheelchair 10. First, the two locking pins 570 connect to the seat frame. In addition, the connector 540A-540B is utilized to connect the side frame 504 to the back 502. The connector 540A-540B can be of various types. In the example illustrated herein, this connector is an over-center latch, and more particularly, the latch component 540B includes a movable lever that attaches to component 540A and is moved to an over-center and locked position to connect the components 540A and 540B together.

In addition to the wheelchair 10 being adapted to be secured to examination table 12, the wheelchair 10 may be secured via the connector assembly 50 to other structures and objects. For example, a seat in a bus could be provided with a connector assembly 50. Similar to the manner of incorporating the connector assembly 50 into the examination table 12, the seat on a bus includes a back portion and a removal seat portion, and the connector assembly 50 is disposed underneath the removal seat portion. By removing the seat portion, the connector assembly 50 would be exposed. Thereafter, the wheelchair 10 is rolled over the area formerly occupied by the seat portion. Locks 402 of the connector assembly 50 would be mounted on a frame which is movable up and down by a linear actuator. Once the wheelchair 10 is positioned over the locks 402, the linear actuator is actuated, causing the locks 402 to move upwardly and engage the locking bar 502 mounted underneath the seat of the wheelchair 10. This securely fastens or locks the wheelchair 10 to the seat of the bus. It is appreciated that the connector assembly 50 will enable the wheelchair 10 to be locked or secured to various other objects and structures.

Control System

Examination table 12 is controlled by either a handheld control 600 or a foot actuated control 602. Selection of the particular mode of control is made through switch 606 located on the backside of back frame 208. See FIGS. 29-35. Hence, a physician, dentist or other attendant can control all of the actuators and the connector assembly 50 by utilizing either the handheld control 600 or the foot actuated control 602. It is appreciated that the control system could be provided with various sensors and limit switches to assist in the proper and orderly operation of the examination table. That is, with the use of limit switches and sensors, the control system can be programmed such that certain functions of the examination table could not be carried out unless certain other conditions were met. Continuing to refer to the back side of the back frame 290, other switches, terminals and outlets are provided. For example, there is provided an emergency stop switch 610, an auxiliary power outlet 608, a pair of terminals 604 for the handheld control 600, a main power switch 612, and an accessory switch 614.

Connecting the Wheelchair to the Examination Table

FIGS. 29-35 illustrate the steps and procedures utilized in connecting the wheelchair 10 to the examination table 12. Wheelchair 10 is positioned adjacent the front end of examination table 12 with the back 502 of wheelchair 10 facing the front of the examination table. See FIG. 29. Usually at this point the seat section 282 of the examination table 12 is secured via the connector 50. To remove the seat section 282, the locks 402 are actuated by the solenoid 404. This opens the jaws 402A and 402B of the two locks 402. Thus, the locking member 314 secured to the seat section 282 is released and the seat section 282 is removed from the examination table 12. This will expose the underlying connector 50, and particularly the locks 402. See FIG. 30.

Attendants can then assure that the examination table 12 is in its extreme lower position. In one embodiment, controls are implemented to require the examination table assume its lowermost position, not be tilted, and the back 280 in the upright position, before the process of attaching the wheelchair 10 to the examination table 12 can proceed. Generally with the removal of the seat section 282 and with the leg rest 284 being in the retracted position, the height of the examination table that must be cleared by the wheelchair 10 is about 14" or less. In any event, once the examination table assumes the position shown in FIG. 30, with the seat section 282 removed and the back 280 in the upright position, the wheelchair 10 can be rolled rearwardly over a portion of the examination table. Guides 522 extending downwardly from the seat 500 will guide the wheelchair 10 into proper alignment with the locks 402. In addition, the wheelchair 10 will be stopped when the locking member 520 of the wheelchair aligns with the locks 402. That is, the locking member 520 will engage the stops 412 formed in the longitudinal members 254 when the locking member 520 overlies the locks 402. Once the wheelchair 10 is properly aligned and positioned over the locks 402, the attendant may inspect the orientation of the wheelchair 10 with respect to the locks 402 to make sure that the locking member 520 is properly aligned with the underlying locks 402. It is contemplated that in one embodiment, the control system for the examination table would call for this visual inspection prior to proceeding with connecting the wheelchair 10 to the examination table 12. The control system may employ one or more sensors to ensure that the wheelchair 10 is properly positioned with respect to the examination table 12 before permitting the coupling of the wheelchair to the examination table to proceed. In one embodiment, the striker or sensor 526 located underneath the wheelchair 10 may function to cooperate with a particularly located switch or other sensor associated with the examination table to enable the examination table to proceed with the wheelchair coupling process. In any event, once alignment is assured, then the attendant opens the locks 402 and raises the examination table 12. As the examination table 12 is raised, the wheelchair 10 will remain supported on the floor or on the baseplate 30. As the examination table moves up the locking member 520 associated with the wheelchair will be guided into the open jaws 402A and 402B of the locks 402 by funnel guides 414. Then as the examination table continues to move up, the weight of the patient will cause the elongated member 520 to exert a force against the jaws 402A and 402B of the locks 402 and cause the locks to mechanically lock.

Thereafter the wheelchair 10 with a patient seated therein will be raised to a selected height. At this point, the attendants can remove the side frames 504 of the wheelchair 10. This will permit a doctor, dentist, or other medical care provider to gain access to the patient for examination and for any procedures or treatments that may be required.

Figure 35:
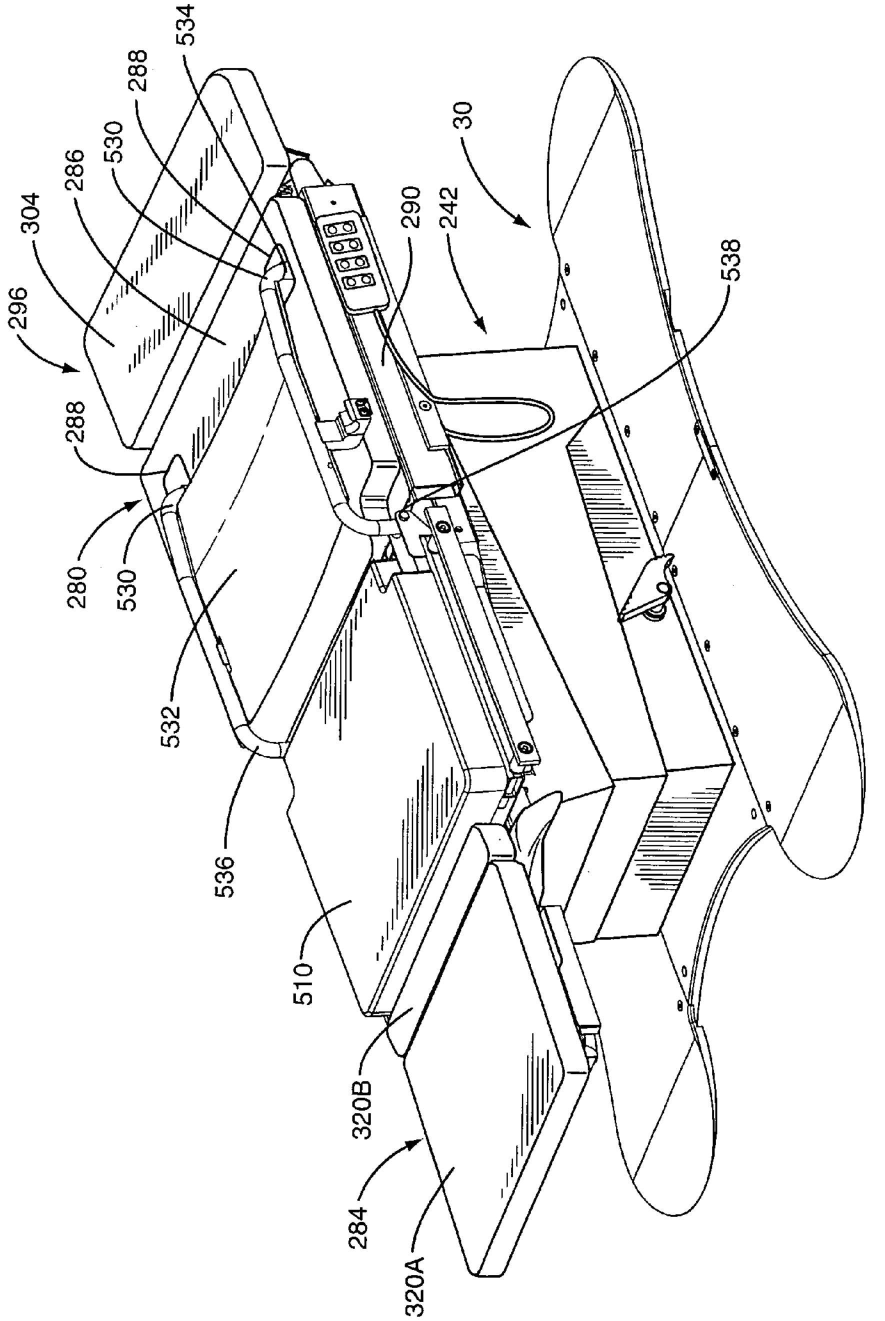
FIG. 35 is a perspective view showing the wheelchair mounted on the examination table and disposed in a generally horizontal configuration.
Figure 36:
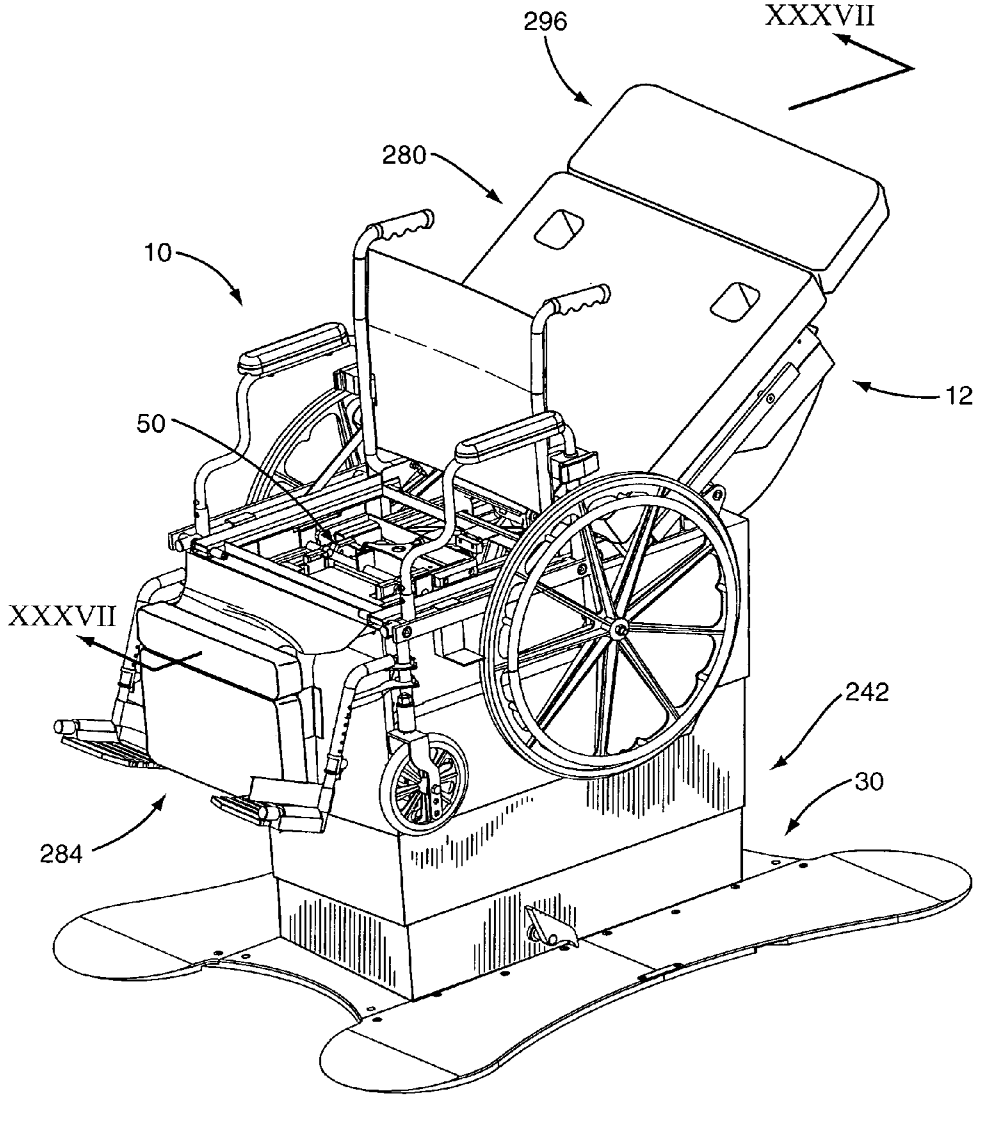
FIG. 36 is a perspective view showing the wheelchair mounted to the examination table with certain portions of the wheelchair being removed to better illustrate the connection of the wheelchair to the examination table.
Figure 37:
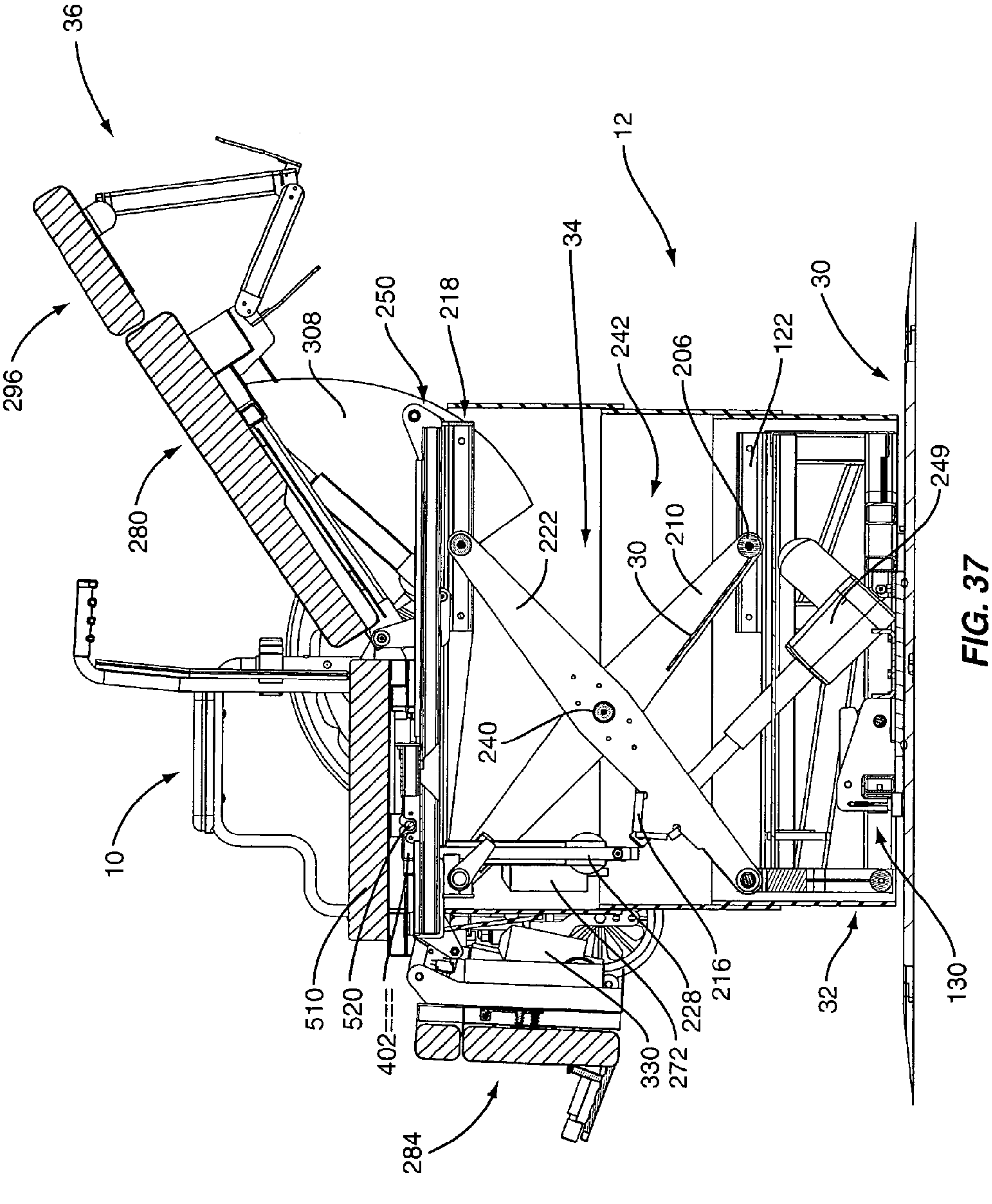
FIG. 37 is a sectional view taken through the lines XXVII-XXVII of FIG. 36.
Figure 38A:
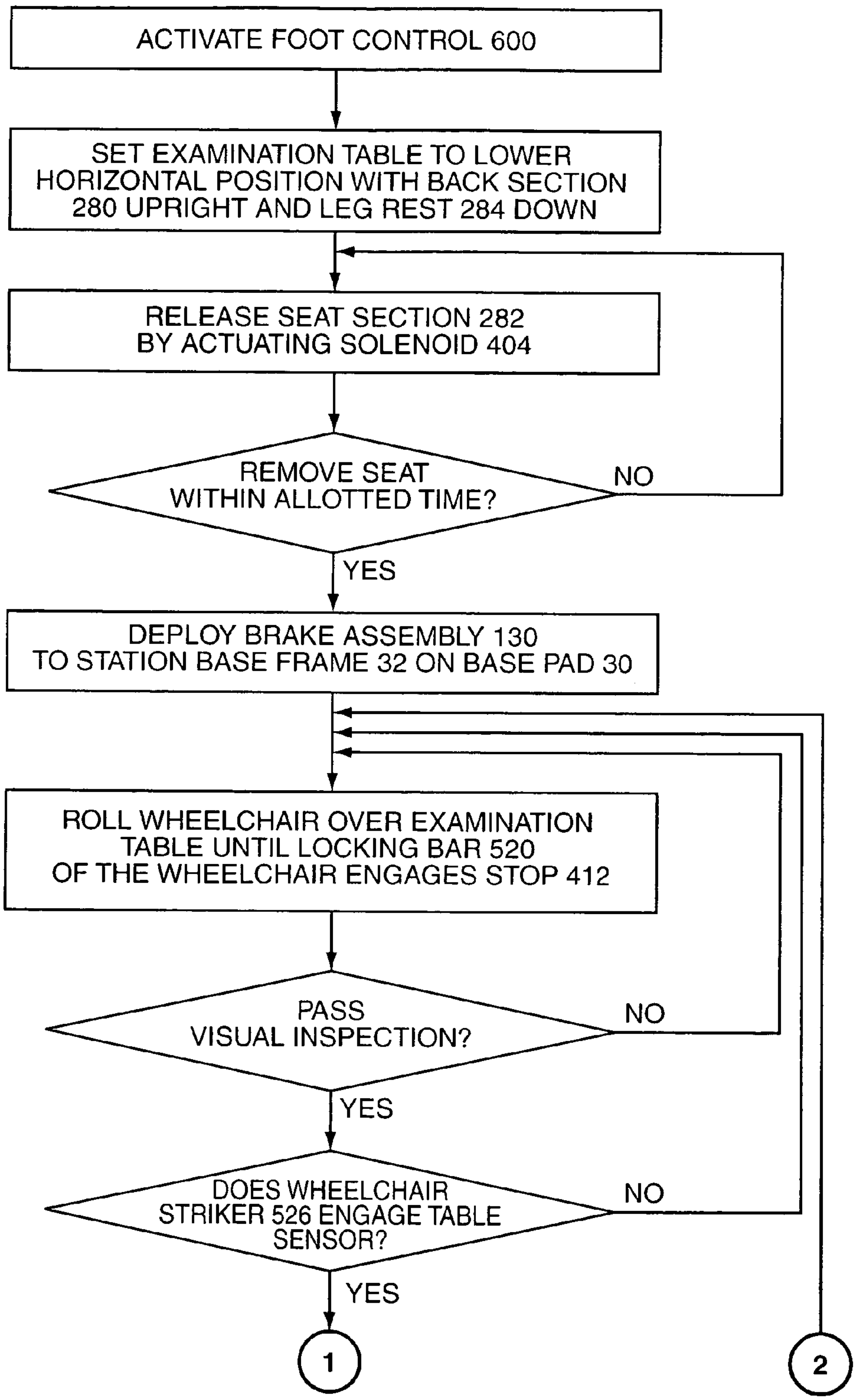
FIGS. 38A and 38B are flow charts relating to procedures employed for connecting the wheelchair to the examination table.
Figure 38B:
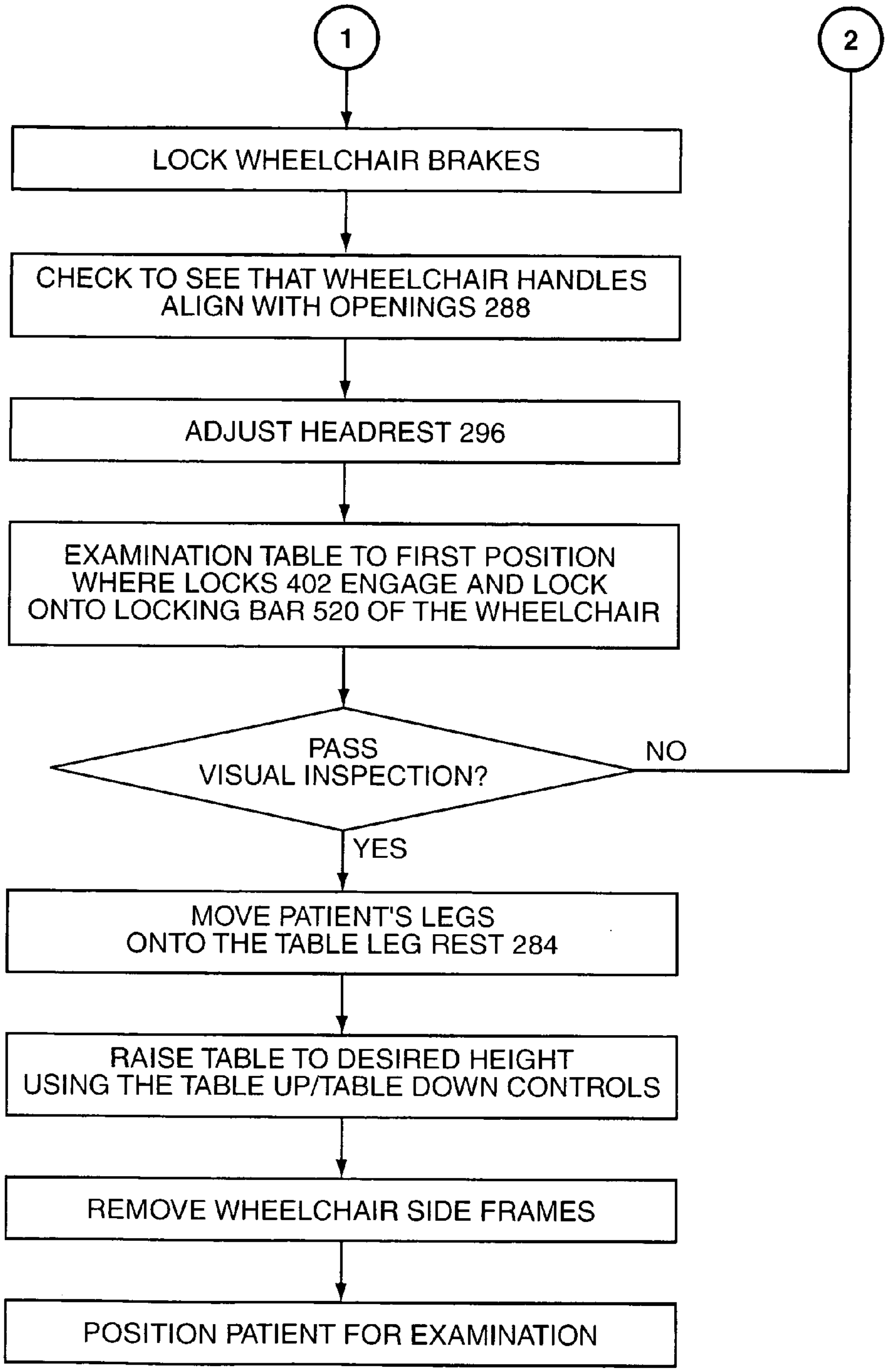

Once the side frames 504 have been removed from the wheelchair 10, then the back 502 can freely rotate with respect to the seat 500. Now the back 280 of the examination table, which initially assumes an upright position, can be reclined. As the back 280 of the examination table 12 reclines, the back 502 of the wheelchair will follow and also recline. This is illustrated in FIG. 35. Hence, the patient while seated in the central section of the wheelchair 10, without the side frames 504 being attached, can be positioned in various positions for examination by a medical care provider. Note in FIG. 35 where the seat 500 and back 502 assume a generally horizontal position.

Once the examination has been completed, the back 280 can be articulated upwardly to its upright position. This will move the back 502 of the wheelchair 10 to a generally upright position. Once the patient assumes this position in the central section of the wheelchair 10 the side frames 504 can be attached. Now the examination table 12 can be lowered. Just prior to the wheels 562, 564 of the wheelchair 10 engaging the underlying support surface, the locks 402 should be positioned in their open or unlocked position by the solenoid 404. Thus, as the examination table is continued to be lowered, the locking member 520 associated with the wheelchair 10 will disengage the locks 402 and once the examination table 12 is in its lowermost position, the wheelchair can be rolled forwardly from the examination table.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A wheelchair adapted to be connected to another structure via one or more locks associated with the other structure, comprising:

a. a seat;

b. a back;

c. a pair of side frames;

d. one or more wheels mounted to each side frame;

e. a locking member mounted on the wheelchair for being engaged by the one or more locks of the other structure for connecting the wheelchair to the other structure; and f. wherein the locking member is mounted underneath the seat of the wheelchair.

2. The wheelchair of claim 1 wherein the locking member comprises an elongated locking shaft.

3. The wheelchair of claim 2 wherein the seat includes a seat frame and wherein the locking member includes an elongated shaft that is secured transversely to the underside of the seat frame.

4. The wheelchair of claim 1 further including the other structure and wherein the other structure includes the one or more locks movable between locked and unlocked positions, and wherein the one or more locks engage and hold the locking member of the wheelchair thereby connecting the wheelchair to the other structure.

5. The wheelchair of claim 4 wherein the other structure includes two spaced apart locks and wherein the locking member includes an elongated locking shaft secured to the wheelchair and extending across an area underneath the seat.

6. The wheelchair of claim 5 including a guide structure for guiding the wheelchair over at least a portion of the other structure.

7. The wheelchair of claim 6 wherein the guide structure includes a pair of spaced apart guides that extend downwardly below the seat of the wheelchair and are spaced such that a portion of the other structure may be projected or moved between the spaced apart guides.

8. The wheelchair of claim 1 wherein the seat includes a seat frame and wherein the locking member includes an elongated shaft that is secured transversely to the underside of the seat frame; and wherein the wheelchair includes a guide structure for guiding the wheelchair over at least a portion of the other structure, and wherein the guide structure includes a pair of spaced apart guides that extend downwardly below the seat of the wheelchair and are spaced such that a portion of the other structure may be projected or moved between the spaced apart guides.

9. The wheelchair of claim 8 further including the other structure and wherein the other structure includes the one or more locks moveable between locked and unlocked positions, and wherein the one or more locks engage and hold the locking member of the wheelchair thereby connecting the wheelchair to the other structure.

10. The wheelchair of claim 1 wherein at least one side frame includes a frame structure having an arm rest and the one or more wheels mounted to the frame structure; the frame structure, one or more wheels and arm rests forming a unit structure that is readily attachable and detachable, as a unit, to the seat and back; and one or more connectors associated with the wheelchair for detachably connecting the unit structure to the seat and back.

11. The wheelchair of claim 10 wherein the wheelchair is provided with means for engaging one or more locks of another structure.

12. A wheelchair comprising:

a. a central section having a seat and a back;

b. at least one side frame;

c. the side frame including a frame structure and one or more wheels and an armrest mounted on the frame structure;

d. the frame structure, one or more wheels and armrests forming a unit structure that is readily attachable to and detachable, as a unit, from the central section;

e. one or more connectors associated with the wheelchair for detachably connecting the unit structure to the central section that includes the seat and back;

f. wherein the unit structure including the frame structure, one or more wheels, and an armrest, is removable as a unit from the central section, and wherein the unit structure is attachable as a unit to the central section;

g. wherein the back is pivotally connected to the seat and wherein the side frame is detachably connected to both the seat and the back; and wherein when the side frame is connected to the central section, the back is generally prevented from pivoting with respect to the seat and wherein the removal of the side frame from the central section permits the back to pivot with respect to the seat; and wherein the one or more connectors include at least two connectors, one connector connecting the side frame to the seat and one connector connecting the side frame to the back; and h. wherein the wheelchair is provided with means for engaging one or more locks of another structure, wherein the means for engaging one or more locks comprises a locking shaft disposed below the seat for enabling the wheelchair to be connected or locked to another structure.

13. The wheelchair of claim 12 wherein the side frame is detachably connected to both the seat and back.

14. The wheelchair of claim 12 wherein the back is pivotally connected to the seat.

15. The wheelchair of claim 12 wherein there is provided two separate side frames and a series of connectors for detachably connecting each side frame to the central section and wherein when each side frame is connected to the central section, the back is generally prevented from pivoting with respect to the seat and wherein the removal of the side frames from the central section permits the back to pivot with respect to the seat.

16. The wheelchair of claim 12 wherein the connector for connecting the side frame to the central section includes a series of pin connectors.

17. The wheelchair of claim 16 wherein the pin connectors extend from the side frame, and wherein there is provided on at least one side of the central section a series of receivers for receiving the pin connectors.

18. The wheelchair of claim 12 wherein the locking shaft extends transversely underneath the seat of the wheelchair.

19. The wheelchair of claim 18 wherein the seat includes a seat frame, and wherein the locking shaft is secured to the seat frame.

20. The wheelchair of claim 12 including a guide structure for guiding the wheelchair over the other structure.

21. The wheelchair of claim 20 wherein the guide structure includes a pair of laterally spaced guides that extend below the seat for guiding the wheelchair over the other structure.

22. The wheelchair of claim 12 wherein each connector is a quick-release connector that enables the side frame to be quickly attached and detached from the seat and back of the wheelchair.

23. The wheelchair of claim 22 wherein each connector is a pin connector or an over-center latch connector.

24. The wheelchair of claim 12 wherein the connector includes three connecting points, two connecting points connecting the side frame to the seat or back, and one connecting point connecting the side frame to the other one of the seat or back.

25. The wheelchair of claim 24 wherein the two connecting points connect the side frame to the seat, and the one connecting point connects the side frame to the back.

26. The wheelchair of claim 24 further including a pin projecting from the side frame into an opening in the central section.

27. The wheelchair of claim 12 wherein at least two of the connectors are elongated pins that project from the side frame into a pair of spaced apart pin sleeves associated with the central section.

28. The wheelchair of claim 12 wherein at least one of the connectors includes an over center latch.

29. The wheelchair of claim 12 wherein the one or more connectors for connecting the side frame to the central section includes at least one pin connector and at least over-center latch; wherein the pin connector extends from the side frame and wherein there is provided on at least one side of the central section a receiver for receiving the pin connector; and wherein the one or more connectors includes an over-center latch for connecting to the back of the wheelchair.

* * * * *